US008804682B2

(12) United States Patent
Hirano et al.

(10) Patent No.: US 8,804,682 B2
(45) Date of Patent: Aug. 12, 2014

(54) APPARATUS FOR MANAGEMENT OF LOCAL IP ACCESS IN A SEGMENTED MOBILE COMMUNICATION SYSTEM

(75) Inventors: Jun Hirano, Osaka (JP); Shinkichi Ikeda, Osaka (JP); Tien Ming Benjamin Koh, Singapore (SG); Hong Cheng, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 535 days.

(21) Appl. No.: 13/264,342

(22) PCT Filed: Apr. 16, 2010

(86) PCT No.: PCT/JP2010/002793
§ 371 (c)(1),
(2), (4) Date: Oct. 31, 2011

(87) PCT Pub. No.: WO2010/119707
PCT Pub. Date: Oct. 21, 2010

(65) Prior Publication Data
US 2012/0039323 A1 Feb. 16, 2012

(30) Foreign Application Priority Data

Apr. 17, 2009 (JP) .............................. 2009-101305
May 8, 2009 (JP) .............................. 2009-113946
Oct. 28, 2009 (JP) .............................. 2009-248093
Feb. 19, 2010 (JP) .............................. 2010-034363

(51) Int. Cl.
H04W 4/00 (2009.01)
H04W 36/38 (2009.01)

(52) U.S. Cl.
CPC ................................. H04W 36/385 (2013.01)
USPC ........................................ 370/338; 370/401

(58) Field of Classification Search
None
See application file for complete search history.

(56) References Cited

U.S. PATENT DOCUMENTS

2009/0209259 A1* 8/2009 Brusilovsky et al. .......... 455/438
2009/0258631 A1* 10/2009 Forsberg et al. .............. 455/411
2010/0195621 A1* 8/2010 Kekki et al. ................... 370/332

FOREIGN PATENT DOCUMENTS

| EP | 2 166 724 | 3/2010 |
|----|-----------|--------|
| WO | 2008/125657 | 10/2008 |
| WO | 2008/125729 | 10/2008 |
| WO | 2008/132163 | 11/2008 |
| WO | 2008/153456 | 12/2008 |

OTHER PUBLICATIONS

Japanese Office Action dated Dec. 10, 2013.
International Search Resort dated Jul. 28, 2010.

(Continued)

Primary Examiner — Kevin C Harper
Assistant Examiner — Peter Chen
(74) Attorney, Agent, or Firm — Dickinson Wright PLLC

(57) ABSTRACT

The present invention introduces a method for managing the route to be used for the user's local device access traffic through the use of intelligent switching performed by the breakout node (eNodeB, home NodeB, or home eNodeB) together with the local access gateway node of the local service domain. Essential information pertaining to performance of this intelligent switching is obtained through the communication of specific tokens using selected channels of communication. A variety of combinations pertaining to the setup, selection and composition of token and channel is possible and described.

7 Claims, 12 Drawing Sheets

(56) References Cited

OTHER PUBLICATIONS

3GPP TR 33.821 V0.10.0, "3$^{rd}$ Generation Partnership Project; Technical Specification Group Services and Systems Aspects; Rationale and track of security decisions in Long Term Evolved (LTE) RAN/ 3GPP System Architecture Evolution (SAE) (Release 8)," XP050334332, Nov. 2008, pp. 1-141.

3GPP TSG SA WG2 Meeting #65, "Resolve Timing problem of non-optimized handover flows from EUTRAN to non-3GPP accesses via S2a/S2b," NEC, et al., TD S2-083690, XP050265890, May 12-16, 2008, pp. 1-3.

3GPP TR R3.020 V0.9.1, "3$^{rd}$ Generation Partnership Project; Technical Specification Group Radio Access Network; Home (e)NodeB; Network aspects (Release 8)," XP050324622, Nov. 2008, pp. 1-68.

3GPP TS 22.220 V1.0.1, "3$^{rd}$ Generation Partnership Project; Technical Specification Group Services and System Aspects; Service requirements for Home NodeBs and Home eNodeBs (Release 9)," Dec. 2008, pp. 1-21.

3GPP TSG-SA1 #43, "Check up of Editors notes in TS 22.220," Editor of TS 22.220 (NEC), S1-084111, Nov. 17-21, 2008, pp. 1-2. Technical Specification Group Services and System Aspects, "Presentation for Information of TS 22.220, Version 1.0.0, on Home Node B (HNB) and Home eNodeB (HeNB)," SA1 (S1-084247+S1-084249), SP-080790, Dec. 8-11, 2008, pp. 1-2.

3GPP TS 23.401 V8.4.0, "3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8)," Dec. 2008, pp. 1-219.

\* cited by examiner

APPARATUS FOR MANAGEMENT OF LOCAL IP ACCESS IN A SEGMENTED MOBILE COMMUNICATION SYSTEM

TECHNICAL FIELD

This invention relates to a mobile data communications network. More specifically, it relates to the management of access to local devices in a mobile communication system.

BACKGROUND ART

With the advance of mobile communication, 3rd Generation Partnership Program (3GPP) introduced the concept of Home NodeB (HNB), or Home eNodeB (HeNB) which are usually deployed as minimised access nodes. The use of these minimised access nodes allows mobile operators to extend their coverage or roll out new services at much faster speed and lower cost. Such nodes leverage upon the existing broadband network facilities of the user and usually translate to lower resource costs as well as relaxed lawful interception requirements for a mobile operator. For the user, connecting via the HNB or HeNB usually means reduced fees and additional services.

With this introduction of consumer premises based access node, 3GPP also created use cases for local IP access (see the following Non-patent Document 1). With the Local IP Access (LIA), a User Equipment (UE) accessing the Close Subscriber Group (CSG) cells of a HNB/HeNB can obtain access to network that is connected to the HNB/HeNB besides the operator's core network. This LIA includes access to the home based network or access to the general Internet without going through the operator's core network. It was also required that the UE can access LIA and the operator's core network at the same time. 3GPP further introduced cases that the UE can access the LIA via a macro-cell.

These new use cases greatly enriched the potential services to be deployed. It also helps to offload some traffic from the core network. Existing operation procedures defined in the following Non-patent Document 2 can be reused to realize these scenarios.

CITATION LIST

Patent Literature

[PTL 1] Vesterinen, Aalto, Kekki, "Method, Radio System, Mobile Terminal and Base Station for Providing Local Breakout Service", WIPO Patent Application Publication WO 2008/125729 A1, 23 Oct. 2008.

Non Patent Literature

[NPL 1] Service requirements for Home NodeBs (HNB) and Home eNodeBs (HeNB), 3GPP TS22.220 v1.0.1 Release 9, 2008-12.
[NPL 2] General Packet Radio Service (GPRS) enhancements for Evolved Universal Terrestrial Radio Access Network (E-UTRAN) access, 3GPP TS23.401 v8.4.0 Release 8, 2008-12.

SUMMARY OF INVENTION

Technical Problem

However, due to the special architecture of the HNB/HeNB, inefficiency exists for the LIA. Because the HNB/HeNB is connected to the operator's core network via an ISP network, it has limited capability over this link, e.g. bandwidth, delay, etc. According to the architecture of the Non-patent Document 1, all the traffic from a UE must go through a Serving Gateway (SGW) before reaching the PDN (Packet Data Network) Gateway (PGW) and the destination. This is done for both accounting purposes as well as the lawful interception requirement for data that transverse the mobile operator's network for when UE is performing LIA in a remote location. However, this requirement has less meaning when the UE is performing LIA locally under the user's own HNB or HeNB. In such a scenario, transiting across the EPC (Evolved Packet Core) becomes costly and inefficient and serves no good purpose.

In one prior invention disclosed in the Non-patent Document 3, the UE is configured to detect the availability of a local breakout service to an IP (Internet Protocol) gateway announced by a serving base station of the UE. The UE can then configure its Internet protocol stack to simultaneously utilise both the local breakout service to Internet as well as continue using its 3GPP services. However, this solution does not solve the issue of seamlessly moving the LIA service from a remote to local state (and vice versa) while maximising the benefits of each mode of operation in a transparent manner that does not impact user experience.

Based on the above, it is obvious that a better solution to the problem is necessary.

It is an object of the invention to solve the above discussed problems. In particular, it aims to provide a method to do what is necessary.

Solution to Problem

To achieve the above-described object, the present invention provides a HeNB. Apparatus for the HeNB which can function as a proxy PGW when UE is accessing LIA locally and seamlessly switch the functionality back to PGW in the EPC when UE is accessing remotely.

Advantageous Effects of Invention

The invention has the advantage of managing the route to be used for the user's local device access traffic through the use of intelligent switching performed by the home NodeB or home eNodeB.

DESCRIPTION OF EMBODIMENTS

In the following description, for the purpose of explanation, specific numbers, times, structures, protocols, and other parameters are set forth in order to provide a thorough understanding of the present invention. However, it will be apparent to anyone skilled in the art that the present invention may be practiced without these specific details.

In the following description, for the purpose of explanation, the 3GPP Long Term Evolution (LTE) is used as example access technology. However, it will be apparent to anyone skilled in the art that the present invention may be practiced with other access technology under the same principle.

Embodiment 1

Figure 1:
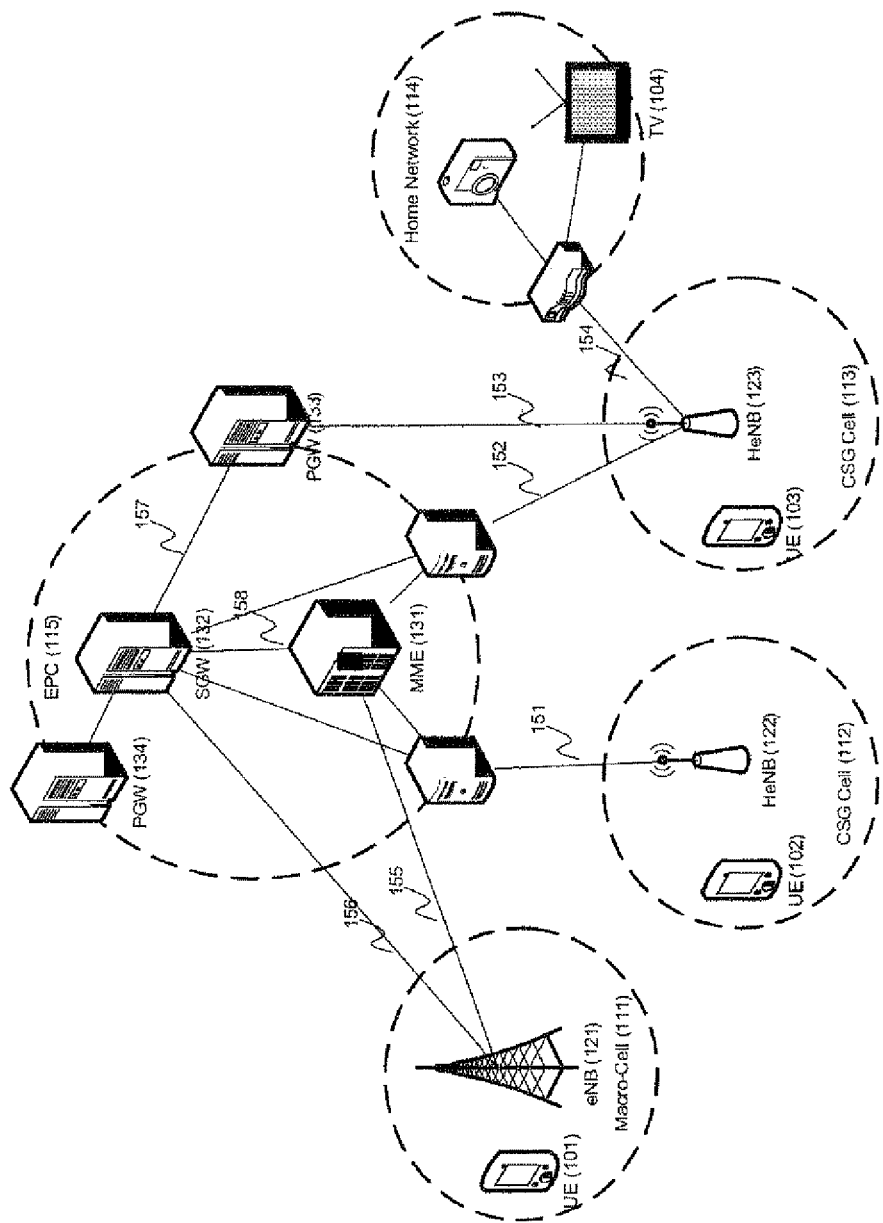
FIG. 1 is a network architecture example which can be applied to the present invention.

FIG. 1 shows a specific deployment of network entities and User Equipment (UE) for optimal operation of the described invention. In this deployment HeNB 123 provides access to the user's home network 114. This invention allows for a preferred operation here forth referred to as the proxy-PGW (PDN-gateway) operation.

With proxy-PGW operation, a UE that is accessing the local IP access service (whether remotely or locally) can be kept unaware of any changes in the entity serving as PGW and may use a common procedure to initiate the service regardless of its current location. From the network point of view, the PGW that is providing the service to UE is PGW 133. However, the network now has the option to allow optimised service to be provided by HeNB 123 by acting as a proxy-PGW for local IP access service from a local UE 103. The benefit to the network is the savings in resources along path 152 and path 153 while the UE enjoys traffic that has lower delay and possibly higher throughput.

For a UE that is accessing local IP devices from a remote location (e.g. UE 101, UE 102), the traffic from the home network 114 transits through path 154 to the HeNB which then proceeds to forward it to PGW 133 via path 153 and in turn to SGW 132 via path 157. Depending on the UE's location, SGW 132 forwards the traffic to either eNB 121 or HeNB 122. In this manner, when user traffic is transversing the EPC 115, the network is able to obtain accurate accounting information via PGW 133 and SGW 132 and would also be able to satisfy any lawful interception requests if needed.

One pre-requisite for the operation of the proxy-PGW is the existence of a channel of communication 153 between HeNB 123 and PGW 133. This communication channel may be implemented in a variety of ways and the example used here is an IP (Internet Protocol) tunnel. An IP tunnel is simply a method of encapsulating an inner IP packet with an outer IP packet for purposes of intermediary routing between two intermediary nodes along the end-to-end path of the original IP packet.

Hence data packets originating from the home network 114 designated for a UE in a remote location would be forwarded by HeNB 123 through the tunnel 153 to PGW 133. Likewise traffic from a UE in a remote location designated for the home network 114 would be forwarded by PGW 133 to HeNB 123 via the tunnel 153 before being sent by HeNB 123 to its final destination (e.g. TV 104).

The creation of this communication channel between the PGW 133 and HeNB 123 may be triggered under a variety of situations. One possibility is that an IP tunnel is always created and maintained between the PGW 133 and the HeNB 123. For example, upon power-up and registration of HeNB 123 with the EPC 115, operator policy or subscription service plans may trigger PGW 133 to set up the tunnel. In this case, the IP tunnel may be shared by different UEs.

Another possibility is that this communication channel is dynamically initialised and maintained when there is an actual request from a UE. The requesting UE either sends PGW 133 information regarding how to contact HeNB 123 such as its IP address or else such information may be stored in the user profile of the UE in the Home Subscriber Server (HSS) or the Mobility Management Entity (MME). In this case, one IP tunnel may be set up per UE.

One specific implementation of the scenario where the UE provides information to PGW 133 regarding HeNB 123 is to carry the required information, for example in the form of a Fully Qualified Domain Name (FQDN) of HeNB 123 in the Protocol Configuration Option (PCO) information element defined in the Non-patent Document 2. PGW 133 can then resolve the FQDN into the actual address of HeNB 123, and establish the IP tunnel accordingly.

Another possibility is that the UE indicates specific service information in the APN (Access Point Name) that is included in the NAS signalling message. MME would then append into the APN the domain information of the HeNB 123 based on UE's subscription information. PGW 133 can then resolve the address of HeNB 123 using this appended APN.

This may be done during the PDN connection setup phase when UE is requesting for local IP access service. The possible procedures as defined in the Non-patent Document 2 include the Service Request procedure as well as the UE Requested PDN Connectivity procedure. It is obvious to anyone skilled in the art that the UE can choose to provide other type of information for the PGW 133 to identify the HeNB 123, e.g. the IP address of the HeNB 123, etc.

Once the set up of the communication channel between PGW 133 and HeNB 123 has been triggered, PGW 133 will proceed to send HeNB a Set-Up-Request message using the information that it has been given. Upon receipt of the Set-Up-Request message, HeNB 123 may optionally perform further authentication and authorisation checks.

For example, if the IP tunnel is dynamically set up based on UE's request, the Set-Up-Request may carry additional information from UE that is derived from some security association with the HeNB 123. This information can be transparently carried in the PCO and forwarded by the PGW 133. HeNB 123 can use this information to decide if a UE can be granted access to the Local IP Access service.

Assuming HeNB 123 accepts the set up request, it proceeds to send a Set-Up-Response message. After the set up messages are exchanged, a security association may be set up between PGW 133 and HeNB 123 protecting the messages exchanged between them.

At this point, HeNB 123 will send a unique token that can uniquely identify this tunnel between itself and PGW 133. This token may take any form such as a text string, integer or hashed string as long as HeNB 123 is able to use it to unerringly identify the tunnel and PGW 133. It should be noted that various permutations exist for setting up a communication channel between two entities and that the element critical to this invention lies in the passing of the token from HeNB 123 to PGW 133.

Figure 2:
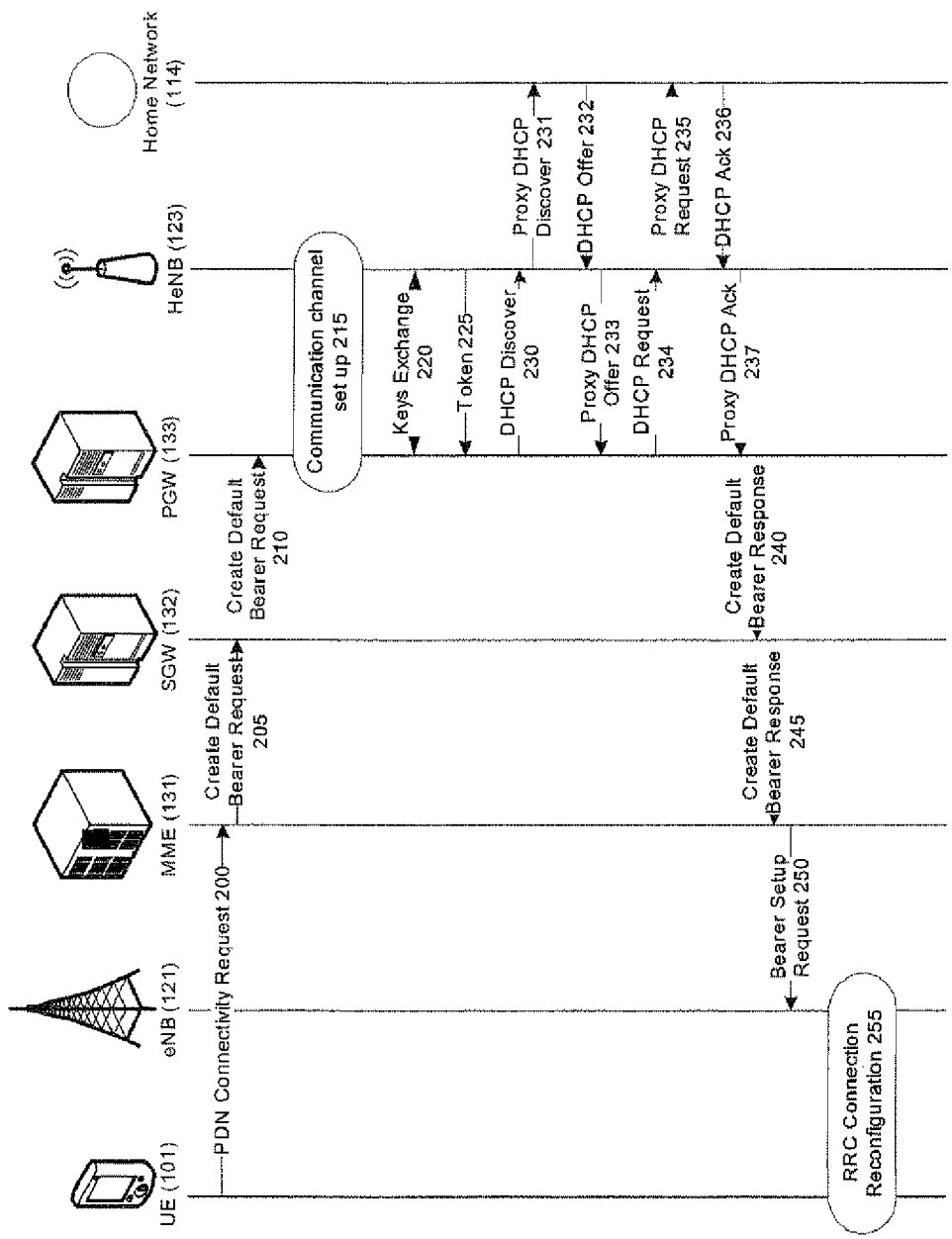
FIG. 2 is an example operation sequence of the present invention for remote initialisation.
Figure 3:
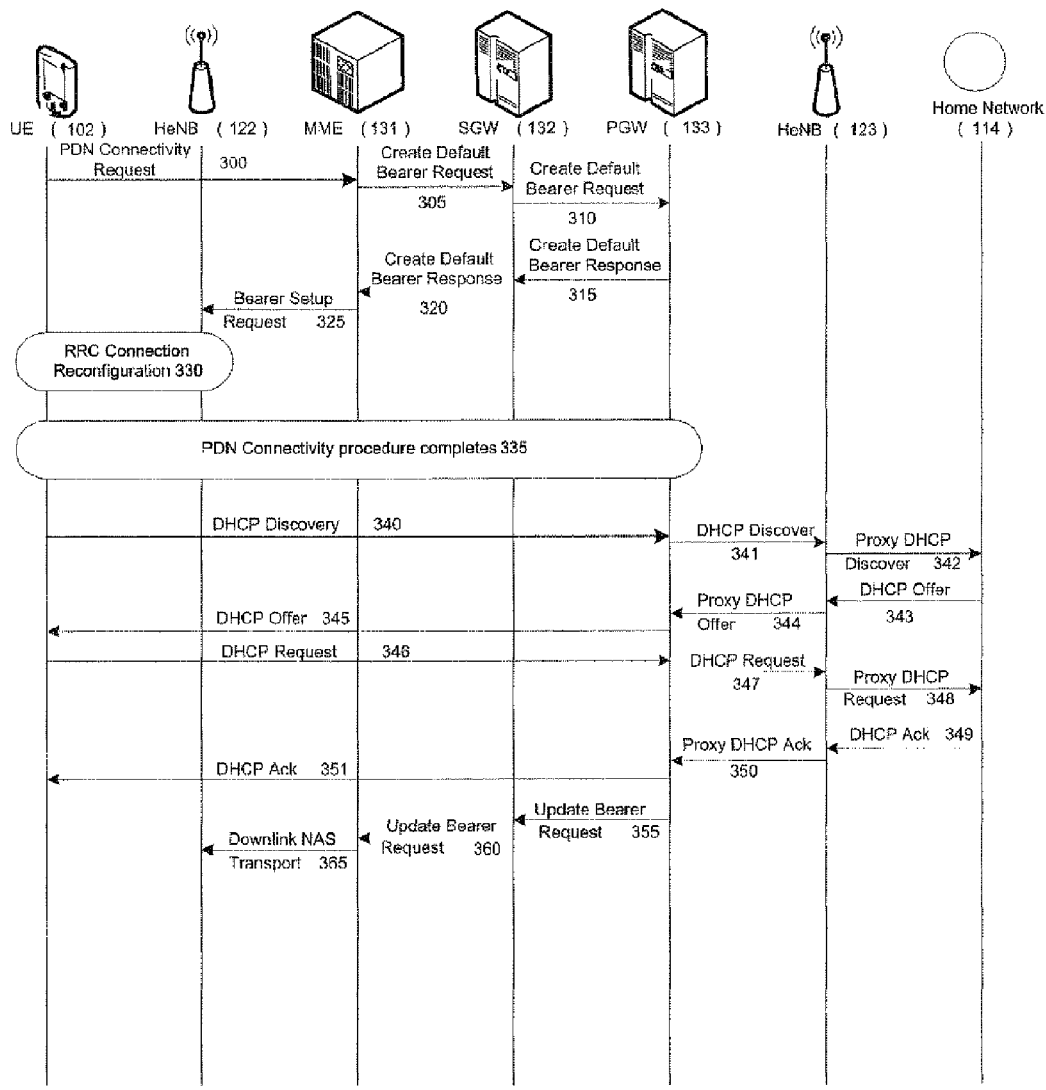
FIG. 3 is an alternative operation sequence of the present invention for remote initialisation.
Figure 4:
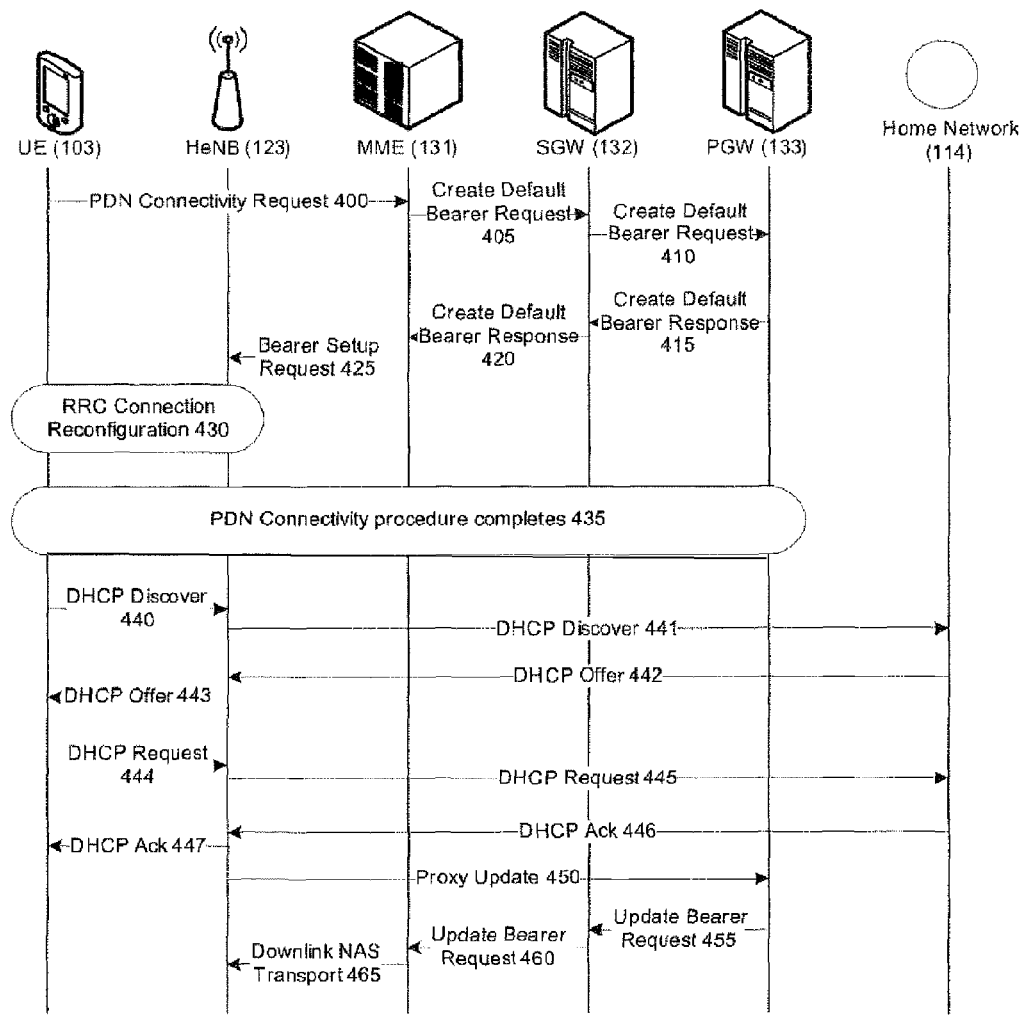
FIG. 4 is an example operation sequence of the present invention for local initialisation.

UE 101 initiates a request for local IP access service from a remote location, namely eNB 121. In one implementation, we assume that a separate PGW 134 is used for 3G services and hence UE 101 utilises the UE Requested PDN Connectivity procedure in order to request for this service. The following describes the working of the invention with the aid of FIG. 2. UE 101 initiates a PDN Connectivity Request 200 and includes the FQDN of HeNB 123 in the PCO to PGW 133.

MME 131 makes relevant authentication checks for UE 101 if required and also performs access control to determine if UE 101 is allowed to remote Local IP access service. It is possible and probable that access to HeNB 123 should be dependent on the Allowed CSG List of UE 101 and MME 131 should also perform the necessary checks. Assuming that UE 101 has the necessary rights to the requested service, MME 131 then sends a Create Default Bearer Request 205 to SGW 132 which then subsequently relays a Create Default Bearer Request 210 to PGW 133.

PGW 133 retrieves the FQDN of HeNB 123 from the PCO and resolves it to obtain the (IP) address of HeNB 123. PGW 133 now checks if it has an existing communication channel with HeNB 123. Since no existing tunnel exists, PGW 133 proceeds to set the communication channel 215 with HeNB 123 as outlined in an earlier description. During this time, security keys are exchanged and HeNB 123 passes a unique token 225 to PGW 133.

PGW 133 associates this token with this communication channel with HeNB 123. It should be noted that HeNB would require knowledge of the security keys that are shared between the respective UEs and PGW 133 (if any) in order to correctly perform its function as a proxy PGW. Hence if PGW 133 uses a different set of security keys for a UE, it must update HeNB 123 with the relevant keys 220.

PGW 133 now proceeds to obtain an IP address from the home network 114 on behalf of UE 101. HeNB 123 acts as a proxy DHCP (Dynamic Host Configuration Protocol) agent for PGW 133 by relaying DHCP messages to and from the home network 114. HeNB should record the yiaddr and chaddr fields of the DHCP Ack message 236. chaddr gives the MAC address of the client (UE 101) that is requesting for an IP address and yiaddr gives the IP address that was assigned to said client.

Hence HeNB 123 will store the chaddr and yiaddr pair for each DHCP Ack that is relayed to PGW 133. HeNB 123 will also proceed to actively forward messages designated for an IP address that corresponds to any of the yiaddr so stored. Messages corresponding to an existing yiaddr entry are sent to PGW 133 via path 153. However, if the proxy PGW functionality has been activated in HeNB 123 then messages would be sent directly to the relevant connected UE.

It is worth mentioning that the chaddr field need not be the MAC address of the UE 101. A variety of implementation possibilities exist which includes using the IMSI (International Mobile Subscriber Identity) or MSISDN (Mobile Subscriber ISDN (Integrated Services Digital Network) number) of UE 101 for the chaddr field.

The key criterion is for the chaddr field to remain the same for the duration that UE is utilising local IP access service from the same HeNB 123. Hence values such as GUTI (Globally Unique Temporary Identity) or TMSI (Temporary Mobile Subscriber identity) are not accepted as they are dependent on the serving MME of the UE and may change in the course of the local IP access service if the serving MME changes.

In a specific implementation of the invention, it is possible that DHCPv6 is utilised by instead. In such an implementation, the functions of the DHCPv4 messages may be applied to their DHCPv6 counterparts. An important difference is the availability and usage of the DUID (DHCP Unique ID) to identify the UE, which can be used as the UE ID in the described invention.

The other factor for consideration is the IAID (Identity Association ID) which is used for each interface for which the UE intends to obtain an address. This identifier should also be recorded by HeNB 123 in the case that the UE intends to configure multiple interfaces using DHCPv6 and should be used to further differentiate the traffic flows.

In one variation to the address allocation procedure, it is possible for PGW 133 and/or HeNB 123 to additionally run a NAT (Network Address Translator) server functionality. In this case, HeNB 123 would translate any outgoing source addresses to an IP address relevant within the home network 114. Likewise for incoming destination addresses, HeNB 123 would change the destination address to the relevant UE's LTE-assigned IP address. In one specific implementation, PGW 133 re-uses the IP address (or prefix) that UE was given for its 3GPP EPC services.

This would be particularly relevant in the scenario where PGW 133 is also the PGW for 3GPP EPC services in addition to providing LIA services. In such a case, PGW 133 may simply allocate a single IP address to the UE for both 3GPP service as well as LIA. In this implementation, this NAT functionality can then be located on HeNB 123, PGW 133 or both for the described invention to operate normally.

In the case where HeNB 123 implements the NAT function, HeNB 123 would record the UE's PGW 133 assigned IP address in order to perform filtering and the UE ID can be the same IP address in order for HeNB 123 to successfully match and perform proxy PGW function.

In another specific implementation, PGW 133 has the NAT functionality and hides the UE's IP address. Instead, it uses its own IP address when communicating with the home network 114. In this case, HeNB 123 can perform as described in the above solution (DHCP proxy) and allow PGW 133 to obtain a home network 114 domain specific IP address. PGW 133 must then inform HeNB 123 via path 153 a specific ID for each UE utilising LIA service from home network 114.

An example of the UE ID to be used in this case may be the UE's IP address and the specific ID could be the TCP (Transmission Control Protocol) port number or any other identifier that PGW 133 uses to differentiate the traffic for a particular UE. HeNB 123 will store this mapping between the UE's IP address, TCP port number and home domain address of PGW 133. When a UE moves into HeNB 123 for local LIA service, HeNB 123 will activate a specialised NAT service only for this UE.

HeNB 123 will forward home network 114 packets matching the home domain IP address of PGW 133 and the identifier given in specific ID by translating the destination address to the UE's IP address. Outgoing traffic to the home network 114 from the UE will likewise be translated to the home domain address of PGW 133 with the identifier given in the specific ID. This will allow HeNB 123 to successfully match and perform proxy PGW function.

In a third specific implementation, both HeNB 123 and PGW 133 contains the NAT functionality. In this case, PGW 133 needs not obtain a home network 114 domain specific IP address but must still inform HeNB 123 via path 153 a specific UE ID for each UE utilising LIA service from home network 114. This will allow HeNB 123 to successfully match and perform proxy PGW function.

It should be noted that stateless address auto-configuration using the prefix allocation process under IP version 6 uses Router Solicitation and Router Advertisement messages instead of DHCP (version 6). But the solution can still work in substantially the same way and what is described should be directly applicable.

One difference is that the choice of the UE ID is likely to be the Source Address in the IP header of the Router Solicitation message sent by PGW 133. HeNB 123 would proceed to provide the address prefix and note the interface identifier of the UE for generating the IPv6 address of the UE.

Upon completion of the DHCP procedure, PGW 133 creates and sends the Create Default Bearer Response 240 to SGW 132. The Create Default Bearer Response 240 includes two new elements which are the HeNB Token and the UE ID (variable used in chaddr during DHCP procedures, for example the MAC address of UE 101). SGW 132 in turn relays the Create Default Bearer Response 245 to MME 131.

Upon receipt, MME 131 will proceed to store the HeNB Token and UE ID under the EPS Bearer ID on which the Create Default Bearer Response 245 is received in its UE context. Before sending the Bearer Setup Request 250, MME checks to see the cell UE 101 is connected to provide local IP access services (e.g. is a CSG cell).

Since eNB 121 is not a CSG cell, MME 131 creates a Bearer Setup Request message 250 but does not include the two new elements. In a variant implementation, it is possible that the two new elements are included in the message but they should be ignored by recipient nodes if not understood.

It should be noted that any of the S1-AP context transfer or SAE (System Architecture Evolution) bearer management messages (e.g. set-up, modify, release, etcetera) may be used in lieu of the Bearer Setup Request 250 to carry the HeNB Token and UE ID elements.

A variant operation will now be described for the case of UE 102 remotely performs local IP access to the home network 114. The key difference lies in the fact that the DHCP procedures can be delayed to take place only after the PDN Connectivity procedure has been successfully completed 335 (external PDN address allocation). Steps 300, 305 and 310 are identical to steps 200, 205 and 210 and will not be repeated here.

After receiving the Create Default Bearer Request 310, PGW 133 checks and detects that an existing tunnel already exists with HeNB 123 with associated HeNB Token. However, PGW 133 in this instance does not initiate DHCP procedures and instead returns only the HeNB Token in the Create Default Bearer Response 315. MME 131 hence only stores the HeNB Token under this particular EPS Bearer ID in the UE context at this point in time.

MME 131 proceeds to check if UE is attached to a CSG cell and this time the result is positive (since HeNB 122 is a CSG cell). In the Bearer Setup Request message 325, MME 131 proceeds to attach the HeNB Token as a new element in the message for HeNB 122. It should be noted that any of the S1-AP context transfer or SAE bearer management messages (e.g. set-up, modify, release, etcetera) may be used in lieu of the Bearer Setup Request 325 to carry the HeNB Token.

HeNB 122 checks the token and realises that it does not belong to itself. At this time HeNB 122 may optionally notify UE 102 using the RRC Connection Reconfiguration message 330 that the local IP access is being performed remotely. This would allow UE 102 to configure certain traffic or applications optimally. For example, UE 102 may decide to relax the timeout requirement of certain application or adjust some codec parameters.

After the PDN Connectivity procedure completes 335, UE initiates DHCP procedures towards PGW 133. Upon receiving the DHCP Discovery message 340, PGW 133 starts DHCP procedures towards the home network 114. The steps taken for the DHCP procedure are actually identical to FIG. 2 so they will not be repeated here.

The only difference is that PGW 133 will appear to be the DHCP server that UE 102 is obtaining the IP address from while at the same time, it is appearing to be a DHCP client from the view of the DHCP server in the home network 114. After the DHCP Ack 351 has been sent to UE 102, PGW 133 will initiate a PDN GW Initiated. Bearer Modification in order to update the UE context in MME 131 with the newly obtained UE ID. This is done by sending the UE ID element within the Update Bearer Request 355.

The MME will inform HeNB 122 of the UE ID for the specific bearer using the Downlink NAS (Non Access Stratum) Transport message 365. However, as HeNB 122 is not the owner of the HeNB Token, it does not take further action.

UE 103 decides to perform local IP access to home network 114. Steps 400 to 425 are similar to what is previously described and will not be repeated here. Upon receiving the Bearer Setup Request 425 and checking the HeNB Token within, HeNB 123 would know that the current bearer for UE 103 is actually utilised to perform local IP access to home network 114.

As such, HeNB 123 should proceed to enable proxy PGW functionality for this bearer and start intercepting outgoing packets from UE 103 on this bearer and directly forwarding it to the home network 114. The DHCP procedure initiated by UE 103 no longer transverses the EPS network but is intercepted and sent directly to home network 114. At the end of the DHCP procedure, HeNB 123 will send a Proxy Update 450 message to PGW 133 to update it with the obtained IP address of UE 103.

It may optionally include a value for UE ID to be used by PGW 133 for storing on MME 131 (steps 455 and 460). However, this is no longer strictly necessary as HeNB 123 is already aware which traffic flow from the home network 114 to be directly sent to UE 103 based on the information obtained during the DHCP process (IP address of UE 103).

Figure 5:
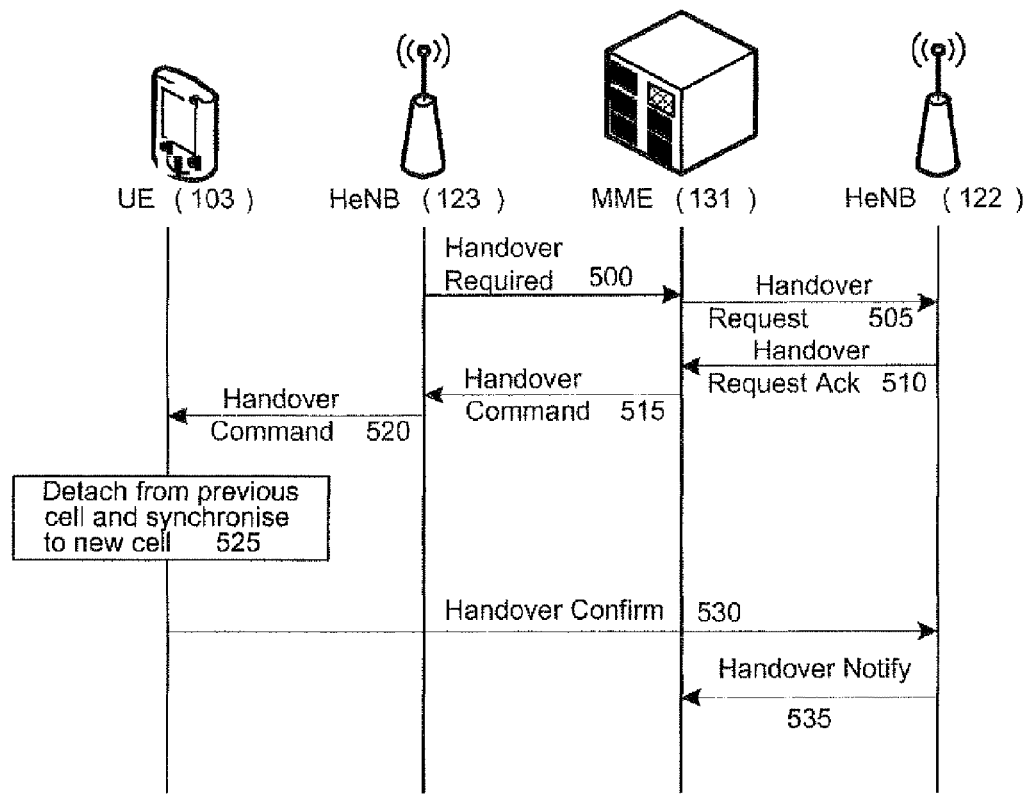
FIG. 5 is an example operation sequence of the present invention for outbound handovers.

Following description addresses the case when UE 103 is moving towards HeNB 122 and a handover is due to take place from HeNB 123 to HeNB 122. With reference to FIG. 5, HeNB 123 first sends a Handover Required message 500 to MME 131. MME 131 detects that the target cell on HeNB 122 is a CSG cell and therefore includes the HeNB Token and UE ID elements of the relevant EPS Bearer in the Handover Request message 505 that is sent to HeNB 122.

HeNB 122 notices that it is not the owner of HeNB Token and needs not perform anything contributing to this invention. It replies with a positive Handover Request Ack message 510 to MME 131 if the handover request is acceptable. Upon receipt of the Handover Request Ack 510, MME 131 proceeds to issue a Handover Command 515 to HeNB 123.

As MME 131 detects that HeNB 123 is also a CSG node, it also attaches the HeNB Token and UE ID elements to the relevant EPS bearer in the message. Recognising its own HeNB Token in the message, HeNB 123 starts to forward the relevant traffic for UE 103 to PGW 133 once UE 103 is detached from HeNB 123. Alternatively, MME 131 can omit checking and sending the new elements in the Handover Command message 515 and instead depend upon HeNB 123 to make its own inferences when preparing UE 103 for handover.

The scenario where UE 102 is moving from HeNB 122 to HeNB 123 will now be described. Taking reference from FIG.

6, HeNB 122 sends a Handover Required message 600 to MME 131 specifying HeNB 123 as the handover target. MME 131 detects that HeNB 122 is a CSG node and includes the HeNB Token and UE ID elements of the relevant EPS Bearer in the Handover Request message 605 that is sent to HeNB 123.

HeNB 123 recognise that it is the owner of HeNB Token and matches the UE ID (chaddr) in order to obtain the IP address (yiaddr) of UE 102. After UE 102 has handed over and synchronised to HeNB 123, HeNB 123 can activate proxy PGW functionality in order to directly forward traffic to and from the home network 114 to UE 102 instead of sending it via path 153 to PGW 133.

Figure 7:
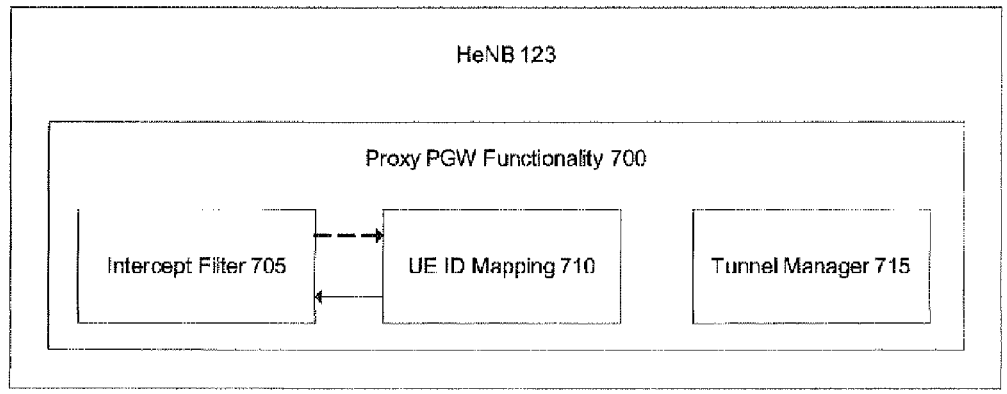
FIG. 7 is an example architecture of the Home eNode B (HeNB) that implements the present invention.

The new functionalities in HeNB 123 required for operation of the invention are shown in FIG. 7. The Proxy PGW Functionality 700 implements a subset of the PGW functionality as defined in the Non-patent Document 2. Proxy PGW Functionality is pre-dominantly concerned about the user plane data and includes the security keys management, the rate control, and the proper handling and processing of received packets. Proxy PGW Functionality further comprises three major components, namely the Intercept Filter function 705, the UE ID Mapping function 710 and the Tunnel Manager 715.

The Intercept Filter functionality 705 is two pronged. On the home network 114 side it manages the list of addresses for which it should forward to the respective UEs. On the CSG cell 113 side it monitors the relevant bearers for which the Proxy PGW Functionality is active and redirects user plane packets to directly enter the home network 114 without undue transition within the EPC (Evolved Packet Core).

The UE ID Mapping 710 component shares the database of the Intercept Filter 705 in order to map a stored UE ID to a specific entry on the home network 114 side of the Intercept Filter 705 functionality. This would be provided as a response to a request from the Proxy PGW Functionality 700. It is also possible to modify the forwarding target of any of the filter list entries within the Intercept Filter 705 database.

The Tunnel Manager 715 functionality manages the tokens and keys specific to each tunnel. It also manages the scenario where HeNB 123 is connected to more than one PGW providing local IP access services in the EPC.

Figure 8:
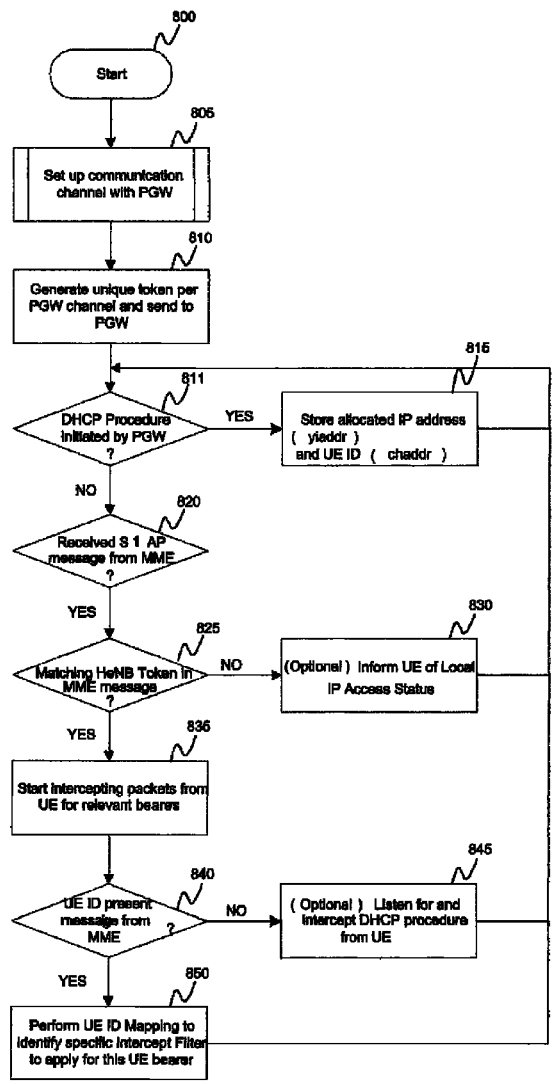
FIG. 8 is an example logic that can be employed by the HeNB.

The behaviour of HeNB 123 has been captured in the format of a flowchart as shown in FIG. 8. Note that this flowchart assumes that the HeNB 123 will setup a communication channel with PGW 133 as part of its de facto behaviour. In any case, HeNB 123 is assumed to have its Proxy PGW functionality 'switched on' when such a communication channel is available with any PGW.

In the event that no such channel exists (e.g. the tunnel is set-up on an ad hoc basis), HeNB 123 need not activate its proxy PGW functionality (i.e. listening and forwarding traffic between EPC 115 and home domain 114). HeNB 123 will first set up the communication channel with PGW 133 (step 805). This will likely take the form of an IP tunnel setup although other forms and methods can apply. The timing of the set up of this communication channel may be static (e.g. upon HeNB start up) or it may be demand driven (e.g. dynamically upon UE request).

Once the communication channel with PGW 133 is established, HeNB 123 must generate a unique token for this channel and communicate it to PGW 133 (step 810). Thereafter, HeNB 123 is in proxy PGW mode and now actively listens for inputs from PGW 133 as well as MME 131. In the case of messages from the MME, HeNB 123 should pay particular attention to handover messages as well as bearer setup messages.

When HeNB 123 detects a DHCP procedure initiated by PGW 133 (step 811) or in fact any form of address allocation procedures, HeNB 123 must proceed to observe and record the outcomes of such procedures. In particular, HeNB 123 should record the resulting allocated IP address as well as the UE-specific identity (UE ID) (step 815).

The allocated IP address is used in a filter list to decide if a particular packet originating from the home network 114 should be forwarded to PGW 133. An example filter entry could be: —

Filter List Entry::=[Destination IP] [UE ID] [Next Hop] *[Additional Specific ID]

The Destination IP field contains the IP address for which HeNB 123 should forward to the 3G network.

The UE ID contains a UE-specific identifier that HeNB 123 will look for and match against for deciding which UE it should send the packet to if the UE is attached locally to the HeNB 123. The Next Hop field tells HeNB 123 whether to forward the packet to PGW 133 or to send it to a locally attached UE. The Additional Specific ID field is an optional field used when a single UE ID is not sufficient to identify a UE, such as the case when PGW 133 is running a NAT functionality.

HeNB 123 will also be looking for any HeNB Token (step 825) and UE ID (step 840) elements included in S1AP messages sent by MME 131 (step 820). It should be noted that a message may contain only the HeNB Token unaccompanied by any UE IDs but the reverse (no HeNB Token, only UE ID) constitutes an error condition.

If the message contains a HeNB Token but the token does not belong to HeNB 123, it may take the optional step of informing UE (step 830) regarding the state of the local IP access, i.e. that UE is performing local IP access from a remote location. Implementation of this step is left to the individual implementer as a possible first step in a separate optimisation for the UE.

If a HeNB Token belonging to HeNB 123 is found in a message from MME, HeNB 123 would start intercepting the packets sent by the UE (step 835) on the specified bearer (may either be implicitly inferred from the context of the MME message or else explicitly stated) and act as a proxy PGW for the UE towards the home network 114.

In the case that an UE ID is present in the same message, HeNB 123 will go through the Filter List Entries to find a matching UE ID field that matches the UE ID present in the message from the MME. When found, HeNB 123 will change the Next Hop field in that entry to reflect that packets originating from the home network 114 should be directly sent to the UE instead of forwarding to PGW 133 (step 850).

If no UE ID was detected, HeNB 123 may optionally specifically listen for and intercept any address allocation procedures (such as DHCP Discovery) initiated by the UE (step 845). It would be left to the implementation whether this feature is to be implemented as a further optimisation. In this case, HeNB 123 needs only inform PGW 133 of the result of the address allocation procedure (i.e. the allocated IP address) and the use of the UE ID is optional.

Embodiment 2

In another preferred embodiment, there exists not just a single communication channel or tunnel between PGW 133 and HeNB 123 but rather, a multitude. In this scenario, a distinct tunnel is set up for each UE requesting to utilise local IP access to the home network 114 and HeNB 123 will then issue a unique HeNB Token per tunnel. There is thus no further need for the UE ID and procedures previously described involving UE ID can be safely skipped.

This is because HeNB 123 will now be able to identify the exact flow of traffic from the home network 114 based on the specific HeNB Token and is able to identify the exact bearer for the UE to intercept based on HeNB Token position in the control message (e.g. Handover Request, Bearer Setup Request, etc). Note that this scenario will result in multiple instances of the behaviour of HeNB 123 as specified in the flowchart of FIG. 8.

Embodiment 3

In another preferred embodiment, HeNB 123 does not contain PGW functionality but rather is more like a network configurable router or agent. Traffic forwarding policies are sent from the EPC 115, either from PGW 133 or MME 131 via path 152 or 153. Operation of the present invention remains essentially Unchanged from what is previously described.

Embodiment 4

In another preferred embodiment, HeNB 123 implements the full PGW functionality. In this scenario, HeNB 123 is actually performing the specified actions of PGW 133 as described in this document. In this case, optimised operations are possible such as a stream-lined address allocation procedure.

It should be noted that in this operation, whether there is only a single SGW in the EPC 115 or there are two SGWs, i.e. one in the EPC 115 and another co-located with HeNB 123, will not significantly affect the operation of the described invention.

Embodiment 5

In another preferred embodiment, the PGW 133 function can collocate with a gateway that connects the HeNB 123 to the EPC 115. For example, the PGW 133 can collocate on the HeNB Gateway, or the security Gateway. In this case, the MME can simply use some static information to allocate the PGW for the local IP access.

Embodiment 6

In another preferred embodiment, PGW 133 provides both EPC services and local IP access to devices and the internet. In such an implementation, it is possible that the PDN Connection for both EPC services and local IP access is the same. In this case, UE 103 may instead utilise the 3GPP procedures for initial Attach or Service Request in order to request for local IP access service from the same PGW.

In this implementation, due to the singularity of PGW, it is possible that UE 103 would re-use the IP address allocated to it for EPC services for local IP access. In such a scenario, UE 103 may likewise utilise the same EPS bearer for both EPC 115 traffic as well as home network 114 traffic. Hence HeNB 123 should now perform destination address comparison to the home network 114 IP domain in deciding whether to forward packets to SGW 132 or directly to the home network 114.

MME 131 may notify HeNB 123 on a per UE basis whether local IP access services should be allowed, this may take the form of a simple flag during the bearer setup or modification procedures. This is especially useful in the case where the HeNB is operating in a Hybrid mode and differentiated levels of access are to be granted to different UEs attached to it. For example HeNB 123 may directly forward traffic between the home network 114 and UE 103 directly if UE 103 is a member of HeNB 123 and otherwise forward all traffic to SGW 132 if UE 103 is not a member of HeNB 123. This may be due to the differentiated accounting and charging structures between members and non-members or other access rights related issues.

Embodiment 7

In another preferred embodiment PGW 134, which provides EPC services, is also utilised by the UE for performing local IP access to devices and the internet. In this implementation, it is possible that the PDN Connection for both EPC services and local IP access is the same. As such, the HeNB can only perform optimised routing of u-plane traffic to local IP destinations by reading the destination IP address of the IP packets originating from the UE.

Since the UE is utilising the same IP address allocated for EPC services for local IP access, it is also likely that the HeNB has to perform Network Address Translation (NAT) functionality in order for packets to and from the home domain to be successfully transmitted and received. In the scenario where local IP access to the internet is available or when there are overlapping address-spaces between the EPC services and the home domain, it is possible for the HeNB to be configured with either PDP or TFT (filter rules) by the operator network in order to correctly forward u-plane packets.

Figure 9:
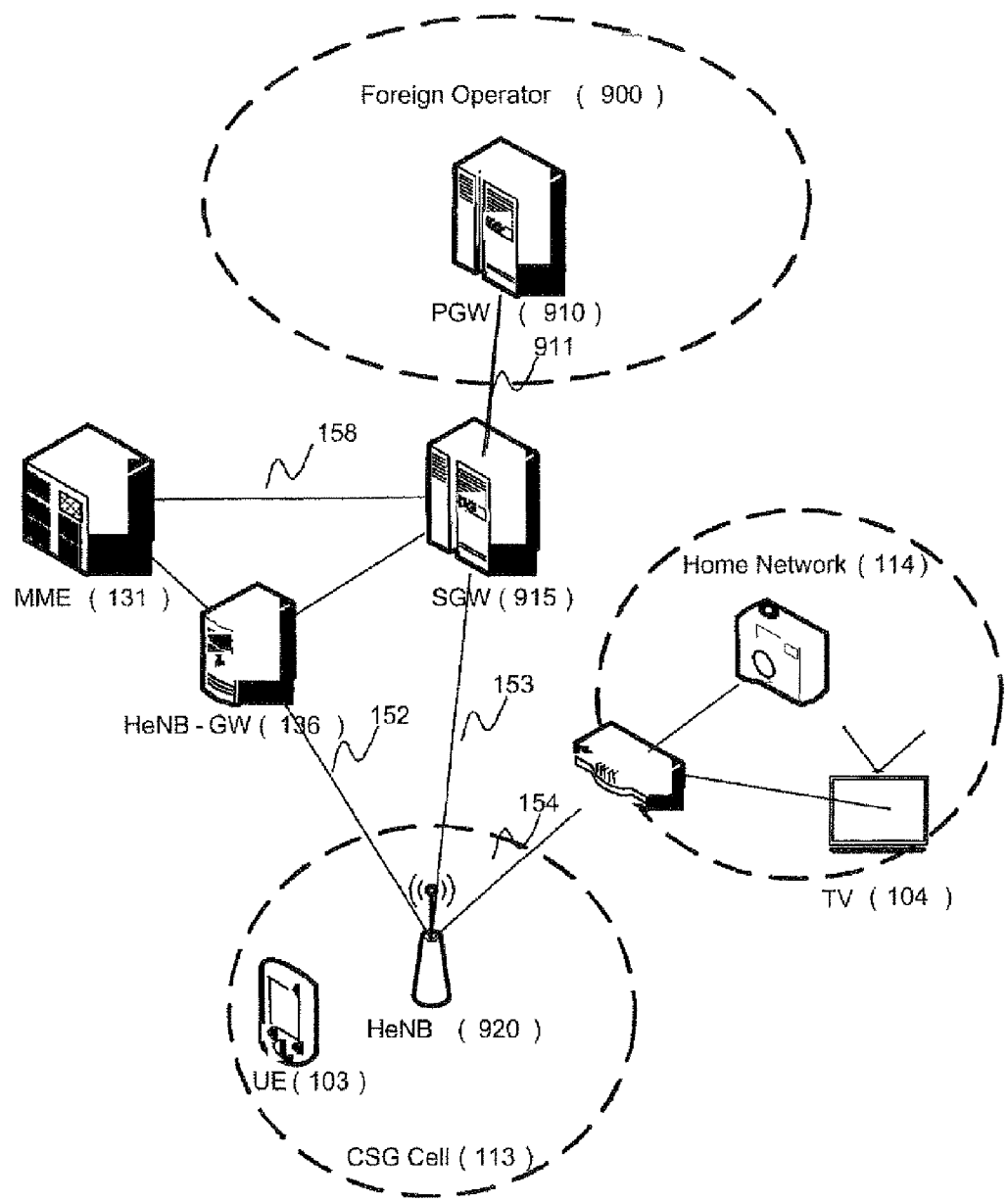
FIG. 9 is another network architecture example which can be applied to the present invention.

However, in the case when the UE belongs to a different operator with whom the operator of the HeNB has a roaming agreement (see FIG. 9), there arises an issue of how the HeNB can be configured to correctly forward packets to PGW 910 which belongs to the foreign operator. In the first instance, there does not exisit any direct interface between PGW 910 and HeNB 920 that can be used to install the relevant filters from the Foreign Operator 900 for forwarding by HeNB 920. Secondly, the home operator may not be amenable to its devices being directly controlled by a foreign operator. Thirdly, the Foreign Operator 900 may not want to install filters that would unnecessarily expose the inner workings of its IP services to the home operator.

In such an event, the described invention may be used for PGW 910 to communicate a set of rules or policies to HeNB 920 for the correct switching of u-plane destinations. According to the invention, HeNB 920 may be triggered to send a special message over the u-plane to PGW 910. This trigger depends on policy and examples include upon the active mode status of UE 103, the start of u-plane traffic from UE, upon sniffing of destination IP address belonging to the Home Network 114 or upon a trigger from. EPC (e.g. MME 131) notifying HeNB 920 of the roaming nature of UE 103 and the necessary procedures to take.

The special message sent to PGW 910 would allow PGW 910 to initiate the communication of parameters for the correct operation of HeNB 920 when forwarding u-plane packets to PGW 910 and the Home Network 114. The special message can be recognisable by PGW 910, for example it may take the form of an expressly crafted IP packet with a special source address (such as the null address, a 0.0.0.0 for IPv4 or 0::0 for IPv6) and may comprise a parameter that will allow HeNB 920 to recognise and identify itself and the referred UE. Examples include the ECGI of HeNB 920, the EPS bearer ID of the UE or the UE local identity.

This would be equivalent to the HeNB token previously described. PGW 910 should be able to identify the UE based on the bearer on which the message is received and the HeNB based on the received message.

PGW 910 can then proceed to update HeNB 920 with the necessary exceptions using rules, policies or filters for continued operation of IP services from the foreign operator 900 network. This communication would take route via path 911 (e.g. 3GPP S8 interface), 158 (e.g. 3GPP S11 interface) and then through path 152 (e.g. 3GPP S1-AP interface) to arrive at HeNB 920. One example of such communication can be the 3GPP Modify EPS Bearer Context procedure.

In the Modify EPS Bearer Context Request message, PGW 910 may include the relevant rules of policies (such as a list of IP addresses) that HeNB 920 should follow, such as to forward the corresponding destination addresses to PGW 910 via path 153 (e.g. 3GPP S1-U interface). MME 131 is then able to process the message with the Foreign Operator 900 policies coming via 158 to be inline with its own operator policies, such as to modify the list of IP addresses to forward whether by adding or deleting certain IP addresses, before relaying it to HeNB 920. The modification of the Foreign Operator 900 policies may be due to internal policies or subject to the roaming agreement between operators.

Upon receiving the message containing the rules or policies of the Foreign Operator 900, HeNB 920 is able to identify the relevant UE to apply the rules due to the bearer upon which the message arrives. HeNB 920 is now able to correctly perform switching of u-plane packets towards SGW 915 and the Home Network 114 for example by comparing the destination IP address of the packets against the list of IP address for which it must send to PGW 910.

Figure 10:
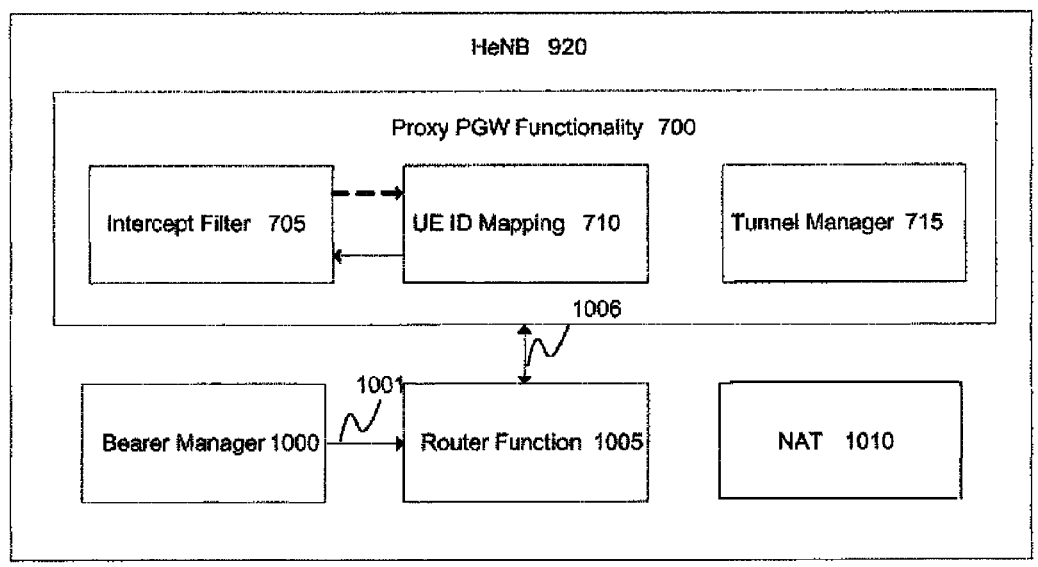
FIG. 10 is an example architecture of another Home eNode B (HeNB) that implements the present invention.

FIG. 10 shows the architectural components of HeNB 920 which describes the main functional blocks. The Proxy PGW Functionality 700 remains largely unchanged in purpose and is still pre-dominantly concerned about the user plane data and the proper handling and processing of received packets. The three major components, Intercept Filter function 705, the UE ID Mapping function 710 and the Tunnel Manager 715 performs the same roles as previously described (with implementation-specific changes in parameters of operation) and will not be further described here.

HeNB 920 however incorporates further functionality in the form of a Bearer Manager 1000, Router Function 1005 and NAT 1010. The Bearer Manager is actually a component of the 3GPP protocol stack but has been enhanced to be able to propagate parameters from the received bearer setup or modification messages to the Router Function 1005 via pathway 1001.

The Router Function 1005 determines the next hop of any received packets (home network 114 or SGW 131) and is able to interact (via pathway 1006) with the Proxy PGW Functionality 700 in order to update its routing table according to policies, rules or filters in addition to the information obtained from the Bearer Manager 1000. The NAT 1010 function is required for the case where the UE's IP address is not usable within the home network and hence requires network address translation for seamless operation.

Embodiment 8

In another preferred embodiment, HeNB 920 will first forward all packets received from UE to PGW 910. PGW 910 should then detect that certain packets are designated for local IP accesses. PGW 910 may be able to perform this detection in variety of manner. It may contain information in its routing table or policy and rules function such that it is aware which addresses are actually for accessing Local IP services to the home based network or Internet.

For example if the UE is attempting to access a private IP address (IPv4) or link- or site-local (IPv6) address. It is also possible that it may query a relevant PCC (Policy and Charging Control) entity such as the PCRF (Policy Control and Charging Rules Function) through the existing Gx interface regarding a destination address. PGW 910 may alternatively consider querying its IP services via the SGi interface. Another possibility for PGW 910 to detect that an address could be designated for the home network 114 may be due to error messages (e.g. ICMP destination unreachable or host not found messages) received when trying to forward the u-plane packets to the relevant destination node.

Upon detection of the addresses that should be optimised by HeNB 920, PGW 910 may use the method previously described (e.g. the 3GPP Bearer Context Modification) in order to install the proper filter rules at HeNB 920. This implementation offers the advantage of a fairly simple HeNB implementation as most of the processing may be done in the network leaving for a less complex and cheaper HeNB.

Embodiment 9

In another preferred embodiment, HeNB 920 sniffs the u-plane packets from UE 103. Those packets with destination addresses that are likely to belong to the home network 114 are marked by HeNB 920 before relaying them to PGW 910. This marking may take a variety forms such as the addition of an IP header or the definition of an additional flag within existing headers.

PGW 910 upon receiving the marked packets will detect if the destination addresses clashes with that of any IP Services that the foreign operator provides. This may be in a manner similar to that is previously described. PGW 910 may then install rules, policies or filters on HeNB 920 in a like manner as described elsewhere in the described invention.

Embodiment 10

In another preferred embodiment, it is possible that there are address space overlaps between the IP services provided through PGW 910 and the IP devices in the home network 114. In such a scenario, for a legacy UE (3GPP release 8 or earlier), the default decision to be taken may be to either always send such packets to the PGW 910 or to prefer local IP access via HeNB 920.

In the case of an enhanced terminal, it is possible that PGW 910 may initiate a dedicated bearer creation in order to allow for clear differentiation of traffic for EPC services from traffic for the home network 114. User input may be solicited or else profiles or some other preference settings may be applied to decide the correct bearer (PGW 910 or Home Network 114) to be used when the UE sends u-plane packets. HeNB 920 may then depend on the bearer on which the incoming u-plane traffic is sent to determine its switching behaviour.

Embodiment 11

<Default Operation Using MME to Pass LGW Tokens from PGW to HeNB>

Figure 11:
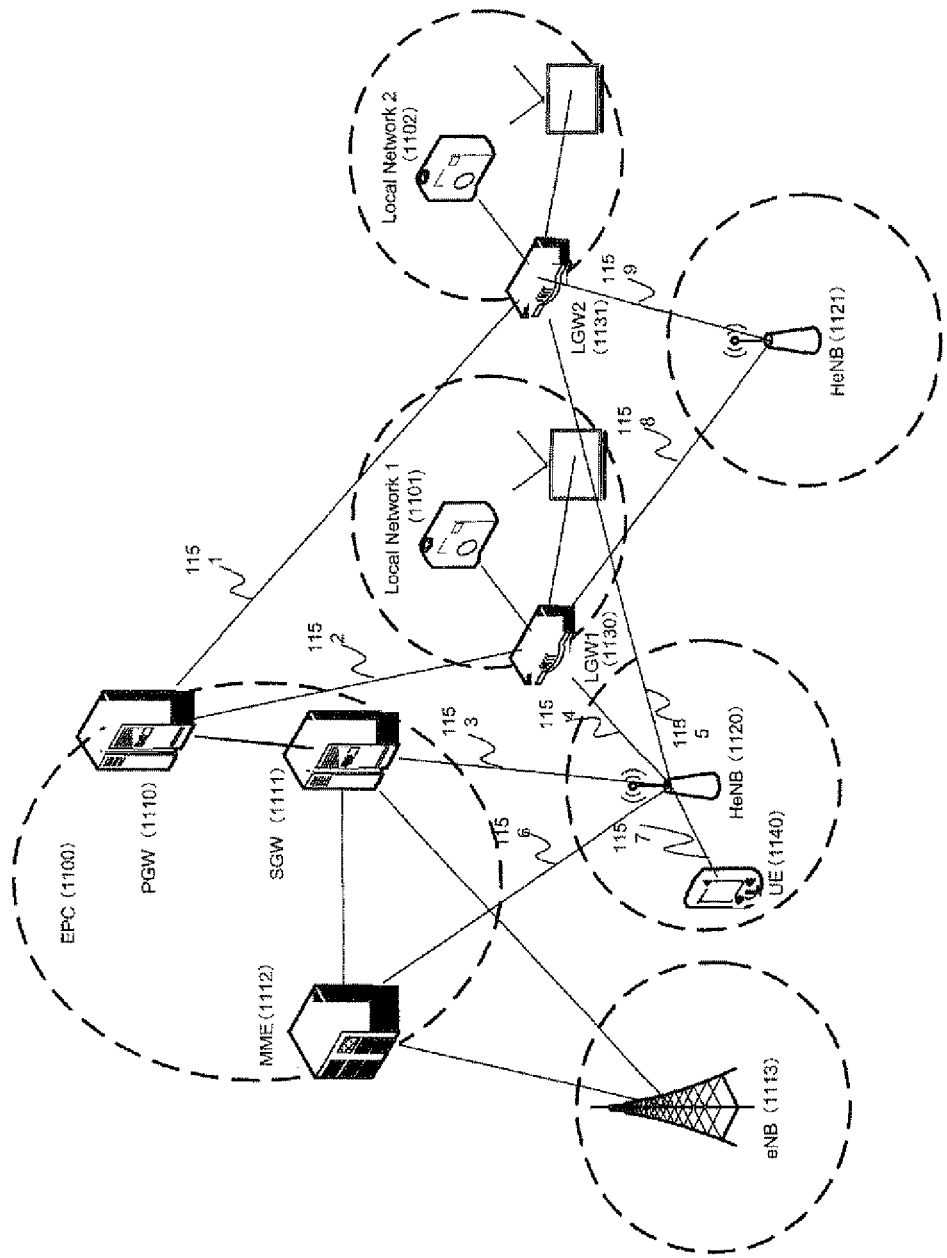
FIG. 11 is a network architecture example which can be applied to the present invention.

In another preferred embodiment, an alternative deployment scenario is described and shown in FIG. 11. In this deployment, accesses to local network services (or local IP access services) (1101, 1102) are via Local Access Gateways or Local Gateways (LGWs) 1130 and 1131, e.g. which may be IP routers or Layer 2 switches. A local breakout is possible at selective nodes such as HeNB 1120. It should be noted that other node types such as the eNodeB, NodeB or Home NodeB may substitute for the role of HeNB 1120 without significant change to the operation of the described solution.

It can be seen that PGW 1110 has interfaces to Local Access Gateways via path 1151 to LGW 1131 and path 1152 to LGW 1130. These interfaces go over the SGi or Gi interface between PDN Gateway (PGW) and Packet Data Network (PDN) defined under 3GPP specifications. Although for this deployment, we assume that paths 1151 and 1152 are external paths that lie entirely outside of the 3GPP core network (e.g. EPC) or system, it is possible during deployment for such paths to be virtual and accessed by PGW 1110 by tunnelling through a nearby 3GPP entity such as HeNB 1120.

<Creation of Links Between PGW and LGW>

There are a variety of possible ways by which Information regarding LGWs 1130 and 1131 may be obtained by PGW 1110. This information may have been pre-configured, stored under the user's subscription or else obtained dynamically via databases such as a DNS (Domain Name Service) server or as a request from the UE 1140. In the case where the information is pre-configured, PGW 1110 simply has to look up the information upon receipt of a request to access the services provided by the LGW. For the UE-specified method, the UE may store the information as an IB (information element) within the PCO sent to PGW 1110. PGW 1110 may then perform a search and selection of a qualifying LGW for the case where the UE specifies only a service name, such as APN (Access Point Name), and not a specific server.

In this embodiment, it is described that LGWs 1130 and 1131 performs the procedures, however, it can be done by only one LGW either 1130 or 1131.

<LGW Registration to the PGW, with Supported APN Info; and LGW Initiated Tunnel Establishment>

The LGW 1130 and 1131 may also be pre-configured and programmed to perform a registration towards the PGW 1110. For example, in order to provide the Local IP Access services via the PGW 1110 to the UEs, the LGW 1130 and 1131 will initiate some authentication and tunnel establishment process towards the PGW 1110 or via an intermediary security gateway at boot up time. This can include for example establishment of an IPSec (IP Protocol Security) security association, negotiation of tunnelling protocols, deriving of keys for protection, etc. The initiation for tunnel establishment may be done or triggered by the PGW 1110. The LGW 1130 and 1131 obtains the identity and address of the PGW 1110 or the intermediary security gateway by pre-stored configuration, e.g. a configuration file, SIM/USIM, etc. Alternatively, the operation and maintenance system can be used to configure such information. It is also possible for an owner or operator of the LGW 1130 and 1131 to configuration such information manually via a user interface locally or remotely.

The tunnel establishment can be done prior to UE's connection establishment to the local network or at the same time when UE initiates establishment of relevant PDN connection. In the due process, the LGW 1130 and 1131 can indicate the supported Local IP Access services to the PGW 1110, e.g. forming a APN and register to the PGW 1110. The APN can be formed by including the domain information of the Local IP Access, the service information and some pre-configured ownership information. For example, when the LGW 1130 and 1131 are registered under a corporate account with the operator to provide local printing service, the APN can be formed as "service-printing.acc-CompanyA.mnc-xyz.mcc-lmn.3gpp.org". The PGW 1110 may store such APN information from the LGWs into a system database, such that during the PGW selection process, the 3GPP system can correctly select the PGW to serve the UE using the APN information.

If there is tunnel established during the LGW registration process, it may be shared by multiple or all the UEs. Alternatively, the PGW and LGWs can establish new tunnels, e.g. forking some child security associations, etc, when there are new UEs to be served by the PGW and LGW. This can be achieved by performing the PGW initiated tunnel establishment process as described below.

<UE Specific Connection Establishment Process from PGW>

UE 1140 requests for the Local IP Access service by sending a request to PGW 1110. In one implementation, we assume that the UE 1140 already has at least one PDN connection for 3G services where the UE 1140 connects to a PDN beyond the core network, or another Local IP Access service and hence UE 1140 utilises the UE Requested PDN Connectivity procedure in order to request for this service. It is also possible that the UE 1140 requests the Local IP Access service together with the establishment of the default PDN connection, e.g. the UE 1140 initiates the Attach procedure in the cell that supports the local access service. In this case, the UE 1140 includes the necessary information in the Attach Request message it sends to the network. In this case, the network will initiate the establishment of the additional PDN connection for the Local IP Access service. Similar to the previously described procedure, MME 1112 makes the relevant security checks for UE 1140, if required, and also performs access control to determine if UE 1140 is allowed for Local IP Access service. Assuming that UE 1140 has the necessary rights to the requested service, MME 1112 then sends a Create Default Bearer Request to SGW 1111 which then subsequently relays a Create Default Bearer Request to PGW 1110.

PGW 1110 may retrieve the IE from the PCO and resolves it to obtain the (IP) address of the relevant LGW 1130. In another alternative, the PGW 1110 may also decide on the LGW 1130 by checking the UE requested APN/APNs and its stored information about the registered LGW and supported APNs.

PGW 1110 now checks if it has an existing communication channel (e.g. tunnel) with LGW 1130. If no channel exists, PGW 1110 proceeds to set up the communication channel 1152 with LGW 1130 as outlined in an earlier description. During this time, security keys may be exchanged and LGW 1130 passes a token which is locally relevant to the LGW 1130 (LGW Token) to PGW 1110. This token may contain information used by LGW 1130 to identify the communication channel with PGW 1110.

Depending upon the degree of coupling between the operator's network and LGW 1130, LGW 1130 may also attach an appropriate address or identifier (LGW ID) that may be used later by HeNB 1120 to locate the LGW 1130 efficiently. In the case where the operator already has sufficient knowledge of LGW 1130, e.g. LGW 1130 has already registered with the PGW 1110, the PGW can obtain the LGW address or LGW ID via its stored information on LGW.

<NAT Between LGW and PGW Case>

Figure 12:
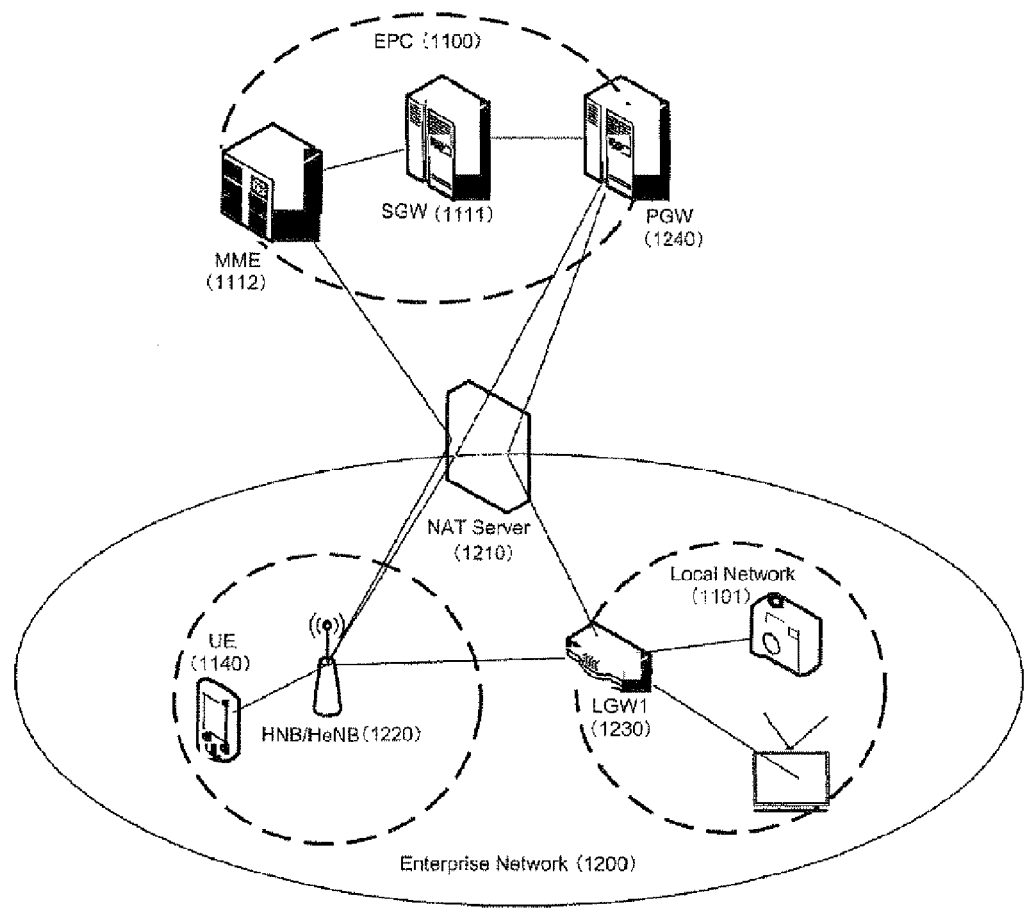
FIG. 12 is a network architecture example (both LGW and H(e)NB belongs to an Enterprise Network) which can apply to the present invention.

FIG. 12 shows a deployment case where both LGW 1230 and H(e)NB 1220 belongs to an Enterprise Network 1200. In this case, there may be a NAT (Network Address Translation) server 1210 between the LGW 1230 and the PGW 1240. Therefore, the PGW 1240 may only be aware of the external (public) address of the LGW 1230 which is the address that the NAT translated for external communication and may be global or private address.

This address would not be useful to the H(e)NB 1220, which is also behind the NAT server 1210 and would only know LGW 1230 from its internal (private) address which may be also private or global address. In this case, what the H(e)NB 1220 needs is the internal address of the LGW 1230, In this case, the LGW ID that is provided by the LGW 1230 itself would be useful for H(e)NB 1220 to derive the internal address to contact the LGW 1230 within the NAT domain 1200, such that the H(e)NB can avoid to be confused and connect to the LGW 1230 efficiently.

<LGW ID as SA Identifier>

In the case where between the PGW 1240 and LGW 1230 there is only a simple tunnel management protocol implemented, there may be no special message for LGW 1230 to convey the LGW ID to the PGW 1240. In this case, the LGW 1230 can piggyback the LGW ID in the SA (security association), e.g. as the SA identifier. Since the LGW ID only needs to contain locally significant information, it can be greatly compressed, e.g. only include the host id instead of network prefix information.

<LGW Info to PGW can be Encrypted to HeNB, i.e. Transparent to PGW>

In the event that LGW 1130 does not want the operator to have knowledge of the network configuration of LGW 1130 and the network behind it, such as for enterprise networks, it is possible to encrypt the information using a security key that is only known to HeNB 1120 (the key can be shared between LGW 1130 and HeNB 1120 statically or dynamically). The encrypted information may be an identifier of local domain significance that HeNB 1120 may use to query a local domain information service such as DNS. For example, the local identifier could be an alias of the LGW, the layer 2 address (e.g. MAC address) of the LGW, or a VLAN (Virtual Local Area Network) tag, etc. Alternatively, the LGW ID may also includes information that indicates the method for establish connection between the HeNB and LGW, e.g. via a specific IP tunnel, a layer 2 VLAN, or a GTP tunnel, etc.

<After Tunnel Establishment, PGW Pass LGW Token and ID to HeNB>

PGW 1110 now creates and sends the Create Default Bearer Response to SGW 1111 as per 3GPP procedure as defined in [2]. The Create Default Bearer Response includes two new elements which are the LGW Token and the LGW ID (if available). SGW 1111 in turn relays the Create Default Bearer Response to MME 1112, Upon receipt, MME 1112 will proceed to store the LGW Token and LGW ID under the EPS Bearer ID (for default bearer if the Local IP Access service is on the PDN connection, otherwise for dedicated bearer if the Local IP Access service is on the dedicated bearer) on which the Create Default Bearer Response is received in its UE context. Before sending the Bearer Setup Request, MME 1112 will check if the cell that UE 1140 is connected to can provide Local IP Access services.

Since HeNB 1120 is capable and allowed to provide Local IP Access service, MME 1112 creates a Bearer Setup Request message that includes the two new elements. In a variant implementation, it is possible that the two new elements are always included in the message and recipient nodes (e.g. HeNB 1120) will always attempt to provide local access services if capable and ignore the options if not. At this step, the MME 1112 stores the information for later use, i.e. when UE performs handover or service request. It is worth noting that any of the S1-AP context transfer or SAE bearer management messages (e.g. set-up, modify, release, etcetera) may be used in lieu of the Bearer Setup Request to carry the LGW Token and LGW ID elements.

<Setup of Link Between HeNB and LGW>

HeNB 1120 upon receiving a Bearer Setup Request carrying the LGW Token and LGW ID, will note the appropriate bearers for performing Local IP Access (as indicated by placement of the LGW Token and LGW ID within the message or otherwise) and initiate communications with LGW 1130 as identified by LGW ID. It may do this by any of the methods previously highlighted (such as directly using the IP address contained in the LGW ID or via DNS query on local network 1101 using the identifier stored in the LGW ID), performing decryption as needed.

Upon locating LGW 1130, HeNB 1120 will initiate a communications channel (shortcut path) 1154 setup (an example may be an IP tunnel) by sending a Setup Request message that carries the LGW Token. LGW 1130 upon receiving the message bearing LGW Token, would verify the correctness of the token and locate the communications channel 1152 referred to by the LGW Token. Upon correctly identifying the communications channel 1152, LGW 1130 would note the pairing between this channel and the newly created communications channel 1154.

If the HeNB 1120 has knowledge on LGW IDs of which LGW can be accessed directly by the HeNB 1120 and the provided LGW ID via the MME is unknown, HeNB 1120 can ignore it and do nothing for the communication channel 1152 establishment with the LGW 1130. Also, if the HeNB 1120 already shares the LGW Token prior to being provided to the PGW by the LGW, or the contents of the LGW Token is well-known to the HeNB 1120, HeNB can verify the token and, if the token is valid, the HeNB 1120 simply updates its routing table for UE towards the LGW 1130, i.e. the HeNB 1120 establishes the communication channel with the LGW. This is advantageous because of few modifications on the LGW and lower cost needed for deployment.

Furthermore, if the contents of the LGW Token can be known to the PGW 1110 (or other trusted node in 3G core network, e.g. AAA server or HSS) or if the PGW 1110 knows information related to the LGW 1130 which is also known to only the HeNB 1120 (or other entities inside the local network to which the HeNB 1120 can contact) (e.g. LGW IP address (for external use), APN for the LGW 1130, or some other keys), the PGW 1110 can create and provide the LGW Token to the HeNB 1120, then the HeNB 1120 will verify the token and, if the token is valid, establishes the communication channel with the LGW 1130, i.e. simply updates its routing table for UE on the route towards the LGW 1130. Such that the LGW 1130 doesn't have to send, receive and verify any token or other information and it is advantageous because the LGW can be completely existing (already deployed) IP router without any modification.

<Using of DHCP to Bind the UE Traffic on LGW>

After UE 1140 has sent the NAS PDN Connectivity Complete message to MME 1112 via HeNB 1120, it is now able to send uplink data and proceeds to obtain an IP address from the local network 1101. UE 1140 initiates DHCP procedures to obtain an address for use in the local network 1101 (local network address) but includes a special option in the DHCP message (DHCP Discover message or DHCP Request message). HeNB 1120 forwards the DHCP message directly to LGW 1130 as this particular UE bearer has been configured for Local IP Access. LGW 1130 acts as a proxy DHCP agent or a DHCP server and intercepts the DHCP packets, reading into the special option.

This option allows LGW 1130 to note that future data with address indicated in DHCP message (e.g. allocated address to UE) as destination address should be forwarded along the path on which this DHCP packet is received. This may be effected through the means of a simple IP filter rule. After UE 1140 obtains a local network address via DHCP, LGW 1130 will note the relationship between the obtained address with the communications channels (1152, 1154). It will also note that data packets designated for this address should be forwarded through the communications channel 1154 at this current point in time.

If the HeNB 1120 has already verified the LGW Token as described above, the UE 1.140 sends a normal DHCP message (DHCP Discover or DHCP Request) without the special option to the local network 1101. The LGW 1130 receives the DHCP message and allocate an IP address to the UE 1140 then sends back a DHCP Ack message finally, or forwards the DHCP messages to a DHCP server in the local network 1101. During sending or forwarding the DHCP Ack message to the UE 1140, the LGW 1130 updates its routing table or neighbour cache with the MAC address described in the MAC header of the DHCP Ack message and the IP address described in the IP header of the DHCP Ack message (and potentially with interface ID connecting to the HeNB 1120 for routing table update).

Such way, the UE 1140 doesn't have to include the special option to transfer the LGW Token and also the LGW 1130 doesn't have to recognize the special option in the DHCP message. This is advantageous because the LGW can be as existing (already deployed) IP router with few or no modification.

The HeNB 1120 may use other way to verify the LGW Token, e.g. intercepting the DHCP packets, capturing and verifying the LGW Token contained in the special option.

<IPv6 Auto-Configure Support>

It is worth mentioning that DHCP version 4 as described above is not the only possible way to implement the described invention. The solution will start work in substantially the same way in the case when RS (Router Solicitations) and RA (Router Advertisements) are utilised or if DHCP version 6 is used instead.

For example, if the IPv6 RS/RA is used for the auto-configuration of address, the UE will generate an address by using its own identity, e.g. MAC address, and the prefix announced in RA. In this case, for the solution to work, the router that announces RA, e.g. PGW or LGW, can set the network controlled flag, such that it would force the UE to send a DHCP message for address configuration.

Alternatively, the UE that implements the solution can send a DHCP message after the address auto-configuration, carrying the self-generated address. In such a case, it is acting as if it is renewing the address using the DHCP message. The LGW will intercept this message and creates the filter and binding for the UE's Local IP Access traffic.

<PGW Allocated Address in NAS>

In certain operation, the UE's address/prefix is allocated during the NAS (Non-Access Stratum) procedure. In this case to allow the solution introduced above to work, the PGW can include a predefined value for the address, e.g. 0.0.0.0, and this can force the UE to perform the DHCP procedure to obtain the address after the connection establishment procedure and the availability of the user plane.

<After Mobility, UE Sends DHCP to Trigger LGW to Update LIPA Traffic Rebinding>

Figure 6:
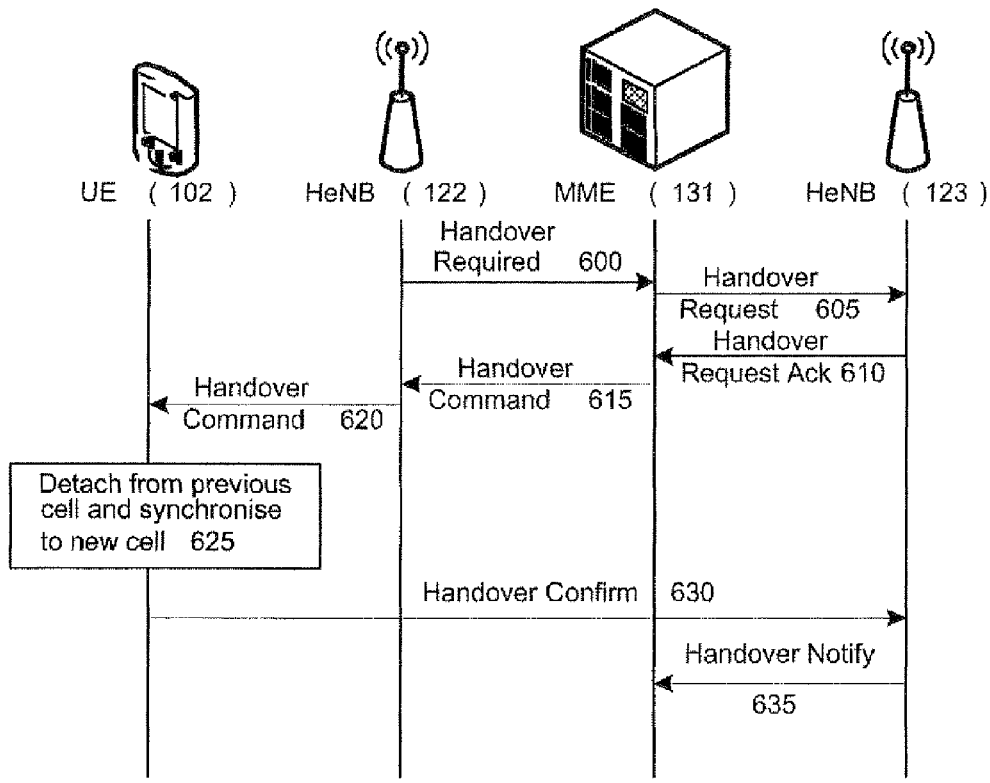
FIG. 6 is an example operation sequence of the present invention for inbound handovers.

UE 1140 now roams over to HeNB 1121. Similar to the previously described process (FIG. 6), HeNB 1120 sends a Handover Required message to MME 1112 specifying HeNB 1121 as the handover target. MME 1112 includes the LGW Token and LGW ID elements of the relevant EPS Bearer in the Handover Request message that is sent to HeNB 1121. HeNB 1121 recognises new information elements proceeds to locate and setup a communications channel 1158 with LGW 1130. After UE 1140 sends the Handover Confirm message to HeNB 1121 at the end of a successful handover, it should realise that it has an existing session with local network 1101.

In this case, it would still notify LGW 1130 using DHCP procedure but it may instead utilise the DHCP Refresh message using the address obtained from local network 1101 and including the special option. Upon receipt of the DHCP Refresh message with the special option, LGW 1130 would then update its records (e.g. routing table or neighbour cache) under the local network address of UE 1140 with communications channel 1152 and the new communications channel 1158 replacing the previous communications channel 1154. It will also note that data packets designated for this address should be forwarded through the communications channel 1158 at this current point in time.

UE 1140 now roams over to eNB 1113. After UE 1140 sends the Handover Confirm message to HeNB 1121 at the end of a successful handover, it should realise that it has an existing session with local network 1101. However, eNB 1113 does not have a direct communications channel with LGW 1130 (possibly due to physical or policy limitations) and either does not receive the new information elements of LGW Token and LGW ID or else takes no action even if received. In this case, when UE 1140 sends the DHCP Refresh message with source address set to that obtained from local network 1101 and including the special option, eNB 1113 would instead forward it to PGW 1110 via SGW 1111.

PGW 1110 would then forward the DHCP Refresh message to LGW 1130 via communications channel 1152. Upon receipt of the DHCP Refresh message with the special option, LGW 1130 would then update its records under the local network address of UE 1140 with communications channel 1152 possibly removing the other communications channel 1158. LGW 1130 will also note that data packets designated for this address should be forwarded through the communications channel 1152 to PGW 1110 at this point in time.

<No Storing of the Token at MME: PGW Requests UE Location Update, Therefore after HO, MME Updates PGW Using Modify Bearer Request, and PGW Resends the Token Via MME Using Modify Bearer Response>

In an alternative operation, the MME 1112 does not need to store any Token information about the LGW. In this case, the PGW will indicate that it requires the update of UE's location information when the PDN connection or bearer for the Local IP Access is established.

After every mobility event that result in a change of UE's serving cell, the MME 1112 will initiate a Modify Bearer Request to the SGW 1111 and relayed towards the PGW 1110. The PGW upon receiving such update will be able to decide if the current cell is allowed for offering the direct connection for Local IP Access to the UE, e.g. using the cell information (for example ECGI). If the PGW decides that the direct connection for Local IP Access from the cell is allowed, it will offer the LGW Token and LGW ID in the Modify Bearer Response message. This can be relayed to the serving cell, i.e. eNodeB or H(e)NB, via any proper S1AP messages.

Alternatively, the PGW does not include the Token or LGW ID in the Modify Bearer Response message. Instead, immediately after the Modify Bearer Response, the PGW triggers an Update Bearer Request, which carries the Token and LGW ID. This will result in the Token and LGW ID to be forwarded to the eNodeB or H(e)NB as well.

Embodiment 12

<Using the UE to Relay the LGW Token and ID to the HeNB>

In another preferred embodiment, UE 1140 requests for the local access service by sending a request to PGW 1110. The information elements for LGW Token and LGW ID are transferred from PGW 1110 to UE 1140 through the use of the PCO carried in the Create Session Response message created by PGW 1110. Upon receipt of the LGW Token and LGW ID in the PCO carried within the RRC Connection Reconfiguration message, UE 1140 would add the LGW ID information element to the RRC Connection Reconfiguration Complete message sent to HeNB 1120.

Upon receipt of the LGW ID, HeNB 1120 would create the communications channel (shortcut path) 1154 with LGW 1130 for the appropriate UE (user plane) bearer as identified by the presence of LGW ID within the RRC Connection Reconfiguration message. UE will then add the LGW Token to the DHCP special option when requesting for a local network 1101 address. LGW 1130 can then match the LGW Token stored within the special option in order to verify and determine the relevant PGW 1110 communications channel 1152.

The UE 1140 may include the LGW Token in addition to the LGW ID in the RRC Connection Reconfiguration message in order for the HeNB 1120 to verify the token so that the creation of the connection channel is ensured. In this case, the UE 1140 does not send the token to the LGW 1130 within DHCP message.

And, upon the handover, the UE will also include the LGW ID and Token in the corresponding RRC Connection Reconfiguration (Handover Complete) message to the eNodeB or H(e)NB, if it decides that the eNodeB or H(e)NB is able to provide direct connection for the Local IP Access towards LGW. This will trigger the corresponding eNodeB or H(e)NB to establish the direct connection towards the LGW for UE's Local IP Access traffic.

Embodiment 13

<Shared PGW for 3G Access and LIA Access Case: Make Use of the UE Requested Bearer Resource Modification to Manage LIA within a PDN Connection>

In yet another preferred embodiment, a method is described for operation of the solution in the event that PGW 1110 is utilised for both 3G as well as local access services. In one implementation, UE 1140 would now utilise the UE requested bearer resource modification described in [2] as a local access service request to trigger its existing PGW (PGW 1110) to start local access service. The trigger message to PGW 1110 may be carried as an additional field or option in the PCO of the Request Bearer Resource Modification message which is transparently carried by MME 1112 and SGW 1111. Upon receipt of the local access service request, PGW 1110 will then determine (such as checking user subscription information or operator policies) if UE 1140 is allowed to access this service.

Assuming that access is granted, PGW 1110 would initiate a form of mobility service for UE 1140, such that UE 1140 is able to effectively utilise multiple IP addresses over its existing PDN connection, e.g. simultaneous home and away. The PGW 1110 initiates a proxy address allocation process to assist the UE to obtain an IP address from. LGW for the Local IP Access services. The new IP address would be registered with the home agent (in this case PGW 1110) as Care-of Address.

PGW 1110 would then install appropriate packet filters (e.g. in TFT; Traffic Flow Template) for local domain traffic on appropriate nodes (such as HeNB 1120 and LGW 1130) in order to achieve direct local access service for UE 1140. This could be achieved by carrying the filter in the Update Bearer Request (Bearer Modify Request) to the H(e)NB via the MME. The new IP address for the UE can be carried in the Session Management Request, e.g. together with the TFTs.

<IP Address Allocated Using External PDN Allocation Procedure, ie UE Requests from PDN Via PGW>

It is also possible for UE 1140 to request for an IP address from the Local Network 1101 via the external PDN allocation procedure whereby PGW 1110 would act as the DHCP server towards UE 1140 and as a DHCP client towards local network 1101. In this, UE should differentiate between requests for a local network address request and the 3G PDN address request. This can be done by configuring through changing some of the fields (such as using different CHADDR fields for 3G and local network service) or including a option within the DHCP messages (for example by requesting the previously allocated IP address for this connection) to indicate the difference.

Taking reference from FIG. 11, UE 1140 wants to utilise its existing PDN connection with PGW 1110 to perform local access service to local network 1102. For this deployment, PGW 1110 is the PDN connection providing 3G service to UE 1140. It is worth noting that it is also possible that PGW 1110 is utilised solely for local access service as previously described and UE 1140 uses this method to request for connection to an additional local network. In this case it would be up to the implementation of PGW 1110 whether UE 1140 is assigned an IP address from the address pool of PGW 1110 or inside PDN to be used as the home address or to dynamically utilise one of the obtained IP addresses from the local networks (1101, 1102).

Upon receipt of the Bearer Resource Command message carrying the PCO with the local access service trigger (which may be the APN or FQDN of the local network 1102), PGW 1110 follows the previously described procedure to establish a communications channel 1151 with LGW 1131. If PGW 1110 obtains an IP address from local network 1102 on behalf of UE 1140, it would automatically register the newly obtained address as an additional Care-of Address before notifying UE 1140 via the normal procedures as defined in [2]. In the event UE 1140 obtains the new IP address on its own, it should then send a Binding Update registering the new local network 1102 IP address as a Care-of Address over its user plane bearer to PGW 1110 which is operating as its home agent.

After PGW 1110 obtains the Care-of Address registration, it should then proceed to install the packet filter for the new Care-of Address on HeNB 1121 and LGW 1131. Installation of the packet filter on LGW 1131 involves a command to add or modify an existing routing entry depending upon the location of UE 1140 sent over communications channel 1151. Packet filter installation on HeNB 1121 may be achieved by re-using the PDN GW initiated bearer modification procedure as defined in [2] to carry packet filters that need to be installed on HeNB 1121.

HeNB 1121 will be triggered to create communications channel 1159 with LGW 1131 upon receipt of the packet filters in order to appropriately forward local access data packets directly. In this deployment, PGW 1110 is fully responsible for the timely updating of the packet filters in order to achieve local access service for UE 1140.

<Different Sequence for when PGW Performs LIA Service Access Control after Handover>

When UE 1140 roams to another point of attachment such as another H(e)NB or macro cell, it is possible for the local context for directly forwarding data for local networks (1101, 1102) to be transferred to the new point of attachment. In this case, UE 1140 may immediately enjoy LIA service while PGW 1110 gets a notification from MME regarding UE's new location information. PGW may then make any necessary changes to the filters on the new point of attachment.

Alternatively, LIA service context is not transferred during handovers. UE should send the DHCP Refresh message to PGW 1110 similar to the external PDN address allocation procedure. PGW 1110 can then make the necessary decisions and take action to install the appropriate filters before LIA service is provided at the new point of attachment.

Embodiment 14

<Making the LGW the Home Agent: Make Use of BU Instead of DHCP for LGW Management>

In an alternative operation, the UE can make use of the same or different PDN connections to access the 3GPP services provided by the core network and the Local IP Access serves. In this alternative, the LGW 1131 will act as a Mobile IP Home Agent for the UE.

The UE will first establish the PDN connection to the PGW using the procedures defined in [2], e.g. Attach or UE requested PDN connection setup, etc. An address will be allocated to the UE as per normal. This address is to be used for the UE to access the 3GPP services provided by the core network. In Mobile IP sense, this will be UE's Care-of Address (CoA).

At the same time, the UE will try to obtain a connection to the LGW. This could be via Mobile IP bootstrap process. Alternatively, the UE can establish a special bearer to the PGW for the LIA services, such that PGW will know that it would route traffic to the LGW.

The UE upon establishment of the PDN connection can try to obtain an address from the Local IP Access domain via the LGW. This address is for the UE's access to the Local IP Access services. In Mobile IP sense, this will be UE's Home Address (HoA).

In the process of obtaining the HoA from LGW, the LGW Token and LGW ID will be provided to the UE. Besides the normal Token and LGW ID, a filter based on the HoA is also associated. For example, in this case, the filter can inform the H(e)NB that packets with the source address HoA should be forwarded to LGW via the local direct connection (communication channel between HeNB and LGW). UE can pass the Token, the LGW ID and the associated filter to the H(e)NB using an appropriate radio layer management message, e.g. Measurement Report, RRC Connection Reconfiguration, self-configuration and self optimisation related message, etc, Alternatively, if the PDN management or Bearer management procedure is used to trigger the Local IP Access establishment, the Token, LGW ID and the associated filter can be passed directly to the H(e)NB via the MME by PGW.

After this, the UE will try to form two Binding Update messages. One is for registering the CoA to the LGW, and is using the CoA as the transport address. One is for de-register any binding, i.e. returning home, and is using the HoA as the transport address. The UE will make sure that the sequence number is assigned in a way that the de-register Binding Update will take precedence of the CoA registering message. UE will send out the two Binding Update messages at the same time to reduce resources to be used, sending the de-register Binding Update message slightly earlier than the registering Binding Update message, or register Binding Update message slightly earlier than the deregister Binding Update message.

When the H(e)NB can support direct connection to the LGW, it will forward the de-register Binding Update to the LGW directly via local connection, as the message is using the HoA as the source address which matches the filter. Upon receiving the Binding Update message, the LGW will switch all the traffic for the UE (with address HoA) to the H(e)NB directly via the local direct connection. The registering Binding Update message routed via the PGW will be dropped silently by the LGW.

If in case that the H(e)NB cannot support the direct connection to the LGW, the de-register Binding Update will be dropped either by the H(e)NB or the PGW, since the address is not valid. In this case, the registering Binding Update will go through and reach the LGW. This will cause the LGW to create a binding cache for the CoA, and route the traffic for UE towards the PGW.

<H(e)NB Forwards RA from LGW and UE Forms HoA Directly>

In case that the UE knows whether the current cell supports direct connection to LGW, e.g. via checking the ECGI list, or other means, the UE can just send one proper Binding Update (registration. BU or de-registration BU) instead of two. For example, a H(e)NB that support Local IP Access may forward the RA message from the LGW. This may be triggered immediately after the establishment of the direct link between the H(e)NB and the LGW as described in previous embodiments (embodiment 1 to 14). The RA from the LGW may be forwarded over the bearer specific for this LIPA access, such that the UE can differentiate between different RAs from different LGWs. In the example, the UE will notice two different RA, i.e. from PGW and LGW. The UE knows that it is both at home and away. The UE can choose to send either BU, or both with some special flag and filters that allows it use both paths for the Local IP Access.

In case the HeNB can be MAG (Mobile Access Gateway) in Proxy Mobile IP sense, the HeNB can send PBU (Proxy Binding Update) message to the LGW instead of UE's sending deregistration Binding Update message, such that the UE can reduce radio resources to be used for sending the deregistration Binding Update message.

Embodiment 15

<Applying the Same Solution to Macro-Cell>

In the above described solution, the access node for the UE to the network is the H(e)NB. However, it is obvious to anyone skilled in the art that the same solution can be applied to the macro-cell or access point, e.g. eNodeB, NodeB, BS, as well.

<Token Includes TAI to Limit the Scope>

In the above described solution, it is also possible for the Token information to include a list of TAIs (Tracking Area IDs) or even cell IDs (e.g. ECGIs), This will allow certain form of access control to be done in the core network, e.g. PGW or MME. In this case, the Token or LGW ID will only be forwarded to the eNodeB or H(e)NB if it falls within the allowed TAIs or the ECGIs (same TAIs or ECGIs as what is contained in the Token informed). This can avoid some excessive signalling at the network side.

In the above described solution, the LGW ID and LGW Token are different information. However, they can be combined into information, e.g. the LGW Token including the LGW ID, LGW ID including the Token Part, or other named information containing the token and the LGW ID at same time.

Embodiment 16

<Dynamic QoS Alignment for Local Access on Mobility>

When the UE initiates a PDN connection (or a dedicated bearer) for the local IP access service, or when the UE handovers to the HeNB which will provide the shortcut path to the local network for the local IP access service to the UE, the PGW (or HeNB/LGW) may modify QoS contexts for the connection and/or bearer dynamically to make the connection broader access than normal 3G access (e.g. access to a PDN beyond EPC) since the local access path between the HeNB and the local network (or the LGW) over shortcut path can be broader through the internal network (e.g. Ethernet, WLAN, PLC, etc).

When the PGW recognizes UE's establishment or handover of the connection during the procedures (Attachment procedure, UE requested PDN connectivity procedure, Handover procedure) as described in [2], the PGW enforces QoS policy to the connection based on rules which are provided by a policy server (e.g. PCRF in 3GPP core network) or owned by the PGW itself. As the rules are basically subscription basis (i.e. statically defined), the user of the UE may require more resources for the local IP access service since it is the communication inside the local network.

Then, if the PGW further recognizes the connection is for local IP access service with shortcut communication path between the HeNB/LGW and the local network (e.g. triggered by the proxy PGW function on the HeNB or the LGW), the PGW obtains new rules from the HeNB (proxy PGW function)/LGW for the local access service, and enforces the rules for the connection/bearer (e.g. using PDN GW initiated bearer modification procedure described in [2]). The PGW can consider subscription of the UE for QoS enforcement for the local IP access services.

For example, the PGW may enforce different QoS policies/rules for several UEs based on their subscriptions; low bit rate for UE(A) because the UE(A) is a customer for the house where the HeNB and local network deployed, high bit rate for UE(B) because the UE(B) is the owner of the HeNB (and the local network), high bit rate for UE(C) because the UE(C) is a special customer allowed to use the local IP access services with good QoS parameters by the owner. The UE can provide additional attributes (e.g. a normal customer, a special customer, the owner, etc) to the PGW (or other entities) containing in a message for the procedures.

When handing over the connection/bearer for the local IP access services from the HeNB, the PGW may shrink the QoS level (i.e. narrower band than the shortcut communication) for the UE and the connection, so that the communication/session will not harm other connections and other UEs.

Such that the appropriate QoS policies/rules can be applied during connection establishment, and the UE starts communication/session with the appropriate QoS from beginning (i.e. no need to adjust after starting the communication/session), thus user benefit can be increased.

Above described QoS control to align with the network aspects (the local network through the shortcut path or normal EPC access) may be initiated by the HeNB or the LGW (e.g. using PDN GW initiated bearer modification procedure described in [2]) soon after the connection establishment procedures or handover procedure before the UE starts the communication/session, so that the PGW doesn't have to be aware about the capability of local IP access service with shortcut communication path for each connection/bearer, thus work load on the PGW can be reduced.

Embodiment 17

For certain services or application, the target local network (Local IP Access Network: LIA network) or the target LGW may be selected based on the location of the user, i.e. UE. Another case would change the contents of the service, system/network capability, QoS support or security level for the service and application based on the user's location, which will provide flexible services or applications on the system. For example, corporate information system may take access restriction for any confidential data or file on employees connecting to the corporate network from outside of the office, while it is allowed for the employees to access such a data or file via access from inside of the office. In other words, the employees connecting remotely to the corporate network (i.e. local network) via base station or access system which doesn't belong to the office network (e.g. its CSG cell doesn't belong to the corporate network system) may be restricted on its access to the corporate network (local network), e.g. with higher security enforced, another specific local network introduced or so on, such that information leakage and security risk could be avoided.

This embodiment discloses a method to provide adaptive service, in which, depending on whether the UE is performing LIA (Local IP Access), i.e. connecting to the local network (i.e. LIA network; corporate network, home network, etc.) via base station (i.e. H(e)NB: HeNB or HNB) which can setup the optimized path/route to the local network, otherwise performing RIA (Remote IP Access), i.e. connecting via base station which is not able to setup the optimized path/route to the local network, it will change the contents of the service, system/network capability, QoS support or security level for the service and application based on the user's location for its access.

Figure 13:
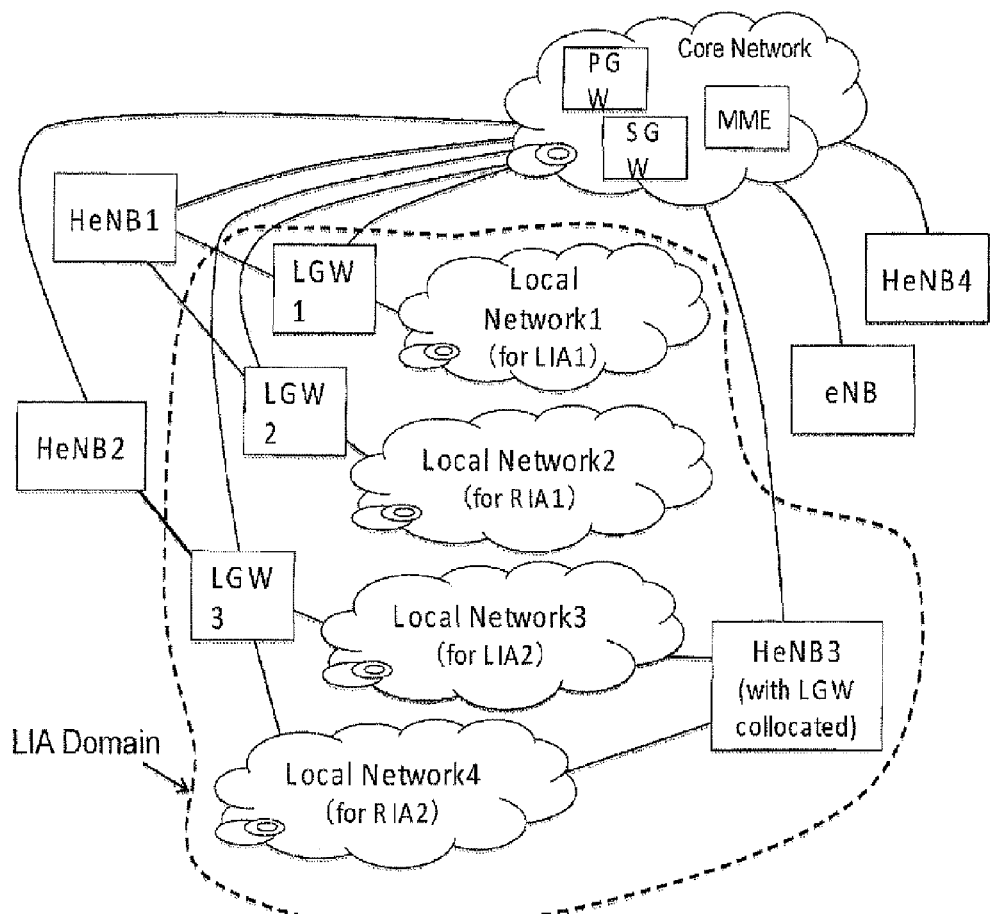
FIG. 13 is an example of network configuration of LIA domain which can be applied to the present invention.

FIG. 13 shows an example of network configuration of LIA domain. There are a couple of local networks, LGWs, HeNBs placed in the LIA domain. Each local network is defined for LIA access or RIA access. Some LGWs may support to connect to more than one local network (i.e. LGW3), and others to just one local network (i.e. LGW1 and LGW2). The HeNB may also support multiple connections to multiple LGWs and setup optimized routes/paths to each LGWs for UE's LIA accesses. The LGW may be collocated in the HeNB and such HeNB with LGW collocated (i.e. HeNB3) can connect to multiple local networks in the same manner as well. This configuration is just an example to explain this embodiment, therefore in actual deployment it would be changed or modified accordingly based on the requirements or nature of the system.

With the configuration, it is assumed that the UE is trying to connect from outside home or company area remotely to the local network via the base station (i.e. eNB or HeNB4 outside the LIA domain) which is not able to optimize the path or route for LIA access towards the local network or area or network including such a base station. As described in the previous embodiments (embodiment 1 to 16), the UE doesn't need to know whether the target base station supports LIA optimization to the local network or not, thus it is possible for the UE to use the same APN for the LIA access, i.e. LIA-APN, in any case for LIA access and RIA access. Such that the burden for LIA/RIA selection can be much reduced and the user can easily connect to the local network without any knowledge.

The access request from/for the UE, i.e. Attach Request, Service Request, handover, etc, is transferred to the MME and the MME transmits Create Bearer Request message, which is forwarded to the PGW via the SGW. However it is obvious to anyone skilled in the art that the same solution can be applied to the case of Create Session Request message utilized as well, it is described in this embodiment about the case of Create Bearer Request message utilized as an example. The MME has included in the message the location information for the UE such as Cell: ID, Base station ID (i.e. (E)CGI (E-UTRAN Cell Global ID or Cell Global ID)), CSG ID, TAI (Tracking Area Update ID), RAI (Routing Area ID), LAI (Location Area ID) or so on. The location information may be one or combination of the IDs above. The PGW processes the Create Bearer Request message to obtain the UE's location information and notifies the LGW, e.g. LGW3, about the location information through the tunnel between the PGW and the LGW which is already established otherwise newly established at this moment.

The LGW detects if the UE's request is for connection establishment from any base station (e.g. HeNB2 in this case) which can setup optimized path/route to the LGW itself (Note that otherwise in some cases it may be relocated to other LGW), and if so, the LGW decides to continue the connection establishment to the local network for LIA (i.e. local network 3) then establishes a path for LIA access towards the local network 3. The established path will be bound by the HeNB (i.e. HeNB2) with UE's radio bearer to complete path/route optimization procedure. Here, the LGW may maintain a list of base stations which can setup the optimized path to LGWs including itself in the LIA domain for purpose of the detection. The LGW checks if the base station via which the UE is trying to connect is included in the list. Otherwise, the LGW may inquire of the base station of which contact address is derived from the UE's location information, e.g. cell ID, (E)CGI, TAI, etc. about its ability to establish optimized path/route.

When the LGW (LGW3) detects that the UE is trying to connect via base station (i.e. eNB or HeNB4 in the figure) which is not able to establish the optimized path/route to the local network, the LGW3 decides to continue the connection establishment to the local network for RIA (i.e. local network 4) then establishes a path for RIA access towards the local network 4. The established path to the local network 4 will be bound by the LGW3 with UE's EPS bearer which is still under establishment.

The LGW may arrange (or change) the contents of the service, system/network capability, QoS support or security level for the service and application based on the user's location. For example, when the UE is connecting via LIA capable base station, the LGW establishes the connection for LIA then allow providing all the services to the UE. The LGW may also request to the authorization server to authorize for increasing UE's access level and the authorization server performs authorization for the request. Because the data path for the UE's LIA connection is kept inside the local area, e.g. inside premise, home, company, etc, it is possible to relax the limitation for the user to access the local network and then the user benefit will be ensured.

Another example is that the routing table and/or the packet filter in the LGW may be configured in order to forward broadcast and/or multicast traffics to the UE on LIA connection. Such that more protocols can be utilized by the service and application then valuable services and applications will be provided to the user.

Yet another case is that the connection for the LIA access may be configured with better QoS parameters so that the throughput for the LIA access will be increased and ensured. For this purpose, the QoS configurations between the local network and the LGW, between the LGW and the PGW, and also between the PGW and the UE will be performed with better parameters, e.g. higher value on MBR/GBR (Maximum Bit Rate/Guaranteed Bit Rate), higher priority of ARP (Allocation and Retention Priority), etc. Furthermore, additional security protocol, e.g. IPsec tunnel, may not be required on the UE, so that the throughput and performance on the UE will increase.

Meanwhile, when the UE is connecting via non LIA capable base station (i.e. the base station has no capability to establish optimized LIA connection), the LGW establishes the connection for RIA then allow to provide only parts of the services to the UE. The LGW may also request to the authorization server to authorize for decreasing UE's access level and the authorization server performs authorization for the request.

Another example is that the routing table and/or the packet filter in the LGW may be configured in order not to forward (otherwise in order to forward with limitation) broadcast and/or multicast traffics to the UE on RIA connection, such that unnecessary traffic and information leakage can be avoided.

Yet another case is that the connection for the RIA access may be configured with appropriate QoS parameters so that the throughput for the RIA access will be kept appropriately and user benefit will be ensured accordingly. For this purpose, the QoS configurations between the local network and the LGW, between the LGW and the PGW, and also between the PGW and the UE will be performed with appropriate parameters, e.g. with aligned QoS parameters between EPS bearer and other paths. Furthermore, additional security protocol, e.g. IPsec tunnel, may be required on the UE, so that the security requirement is not compromised.

When the UE performs handover between a LIA capable base station and a non LIA capable base station, due to change of the UE location, the MME includes the UE location information into Modify Bearer Request message and sends the message to the PGW via the SGW serving the UE. The PGW obtains UE location information from the message and forwards the information to the LGW. Based on the provided UE location information, the LGW selects the target local network (either for LIA or RIA) to be accessed by the UE and establishes the path for UE's connection to the local network in the same manner as described above. In other words, if the handover switches the UE's connection to RIA, the LGW selects the local network for RIA access, if handover to LIA, the LGW selects the local network for LIA access, then performs path establishment for appropriate access for the UE.

During establishment of LIA connection for the UE, if the LGW detects that the HeNB haven't initiated optimized path/route setup for a defined time period after LGW configured the path for the LIA local network, or if the LGW receives an indication from a network node, the LGW releases the path for the LIA access and configures another path for RIA access for the UE, i.e. to the RIA local network. In case where the LGW is not able to configure any path for RIA access for the UE, e.g. a case that the LGW is not allowed to create any path to the RIA local network or other case that the UE is not allowed to access to the RIA local network or to have RIA access itself, the LGW rejects the indication then terminates the connection setup. Also, if the LGW is not able to connect to any RIA local network but knows (e.g. by configuration or inquiring some database) other LGW which can do it, the LGW may initiate LGW relocation procedure, e.g. the LGW sends a relocation request (e.g. including address to the target LGW, etc) to the MME via the SGW then the MME starts to establish another EPS bearer(s), for which parameters or configuration for RIA access may be already applied, to the target LGW and releases the existing EPS bearer(s) for the LIA connection. Here, the indication is, for example, LGW relocation indication (or request) from the MME or the HeNB.

For the case where the contents of the service are arranged (changed or modified), additional service authorization, additional access authentication and/or reconfiguration of authentication/authorization may be required. In particular for the RIA access, more restricted authorization or additional authentication may be performed during Attach, Service Request or handover procedures to establish or switch to the RIA connection. Such authorization/authentication may require user password, access credential, security token, etc. Otherwise, the UE authentication procedure with SIM data and subscription data utilized which is usually required during Attach procedure may be performed again, i.e. particularly for the case of handover from the LIA connection to the RIA connection.

The LGW, the PGW or the PCRF (Policy and Charging Rules Function) may differentiate the charging policies and/or rules to be applied for the LIA and RIA accesses (or connections). For example, it may be required for the RIA connection, which would consume more resources in the operator's core network, higher price rate to be applied than for the LIA connection. The LGW or the PGW may notify the SGW about the change from the LIA access to the RIA access (otherwise the SGW itself detects its change), so that the SGW will collect the charging data for UE's RIA access. The charging policy and rules may be provided from the PCRF at the change between LIA/RIA accesses otherwise may be described in the subscription data for the UE.

Therefore, it is possible for the system to arrange the service contents, its capability, etc, then to provide various services and applications to the users. This will ensure benefit on the service providers and application providers, and finally more on users served by the system.

In another case, the LGW may be appropriately selected based on the UE location for the access to the local network. When the UE requests its connectivity, i.e. on Attach Request, Service Request, etc, the MME receives the request then selects a PGW which will serve the UE. Based on the UE context (e.g. MM context), subscription data, local data, etc, the MME detects if the connection being established for the UE is for LIA, i.e. connecting via LIA capable base station (i.e. HeNB) or CSG cell, or RIA, i.e. connecting via non LIA capable base station or CSG cell. If the connection is detected as for LIA, the MME assigns the PGW which has connection to the LGW serving the local network for LIA (e.g. LGW1). If it is detected as for RIA, the PGW having connection to the LGW serving the local network for RIA (e.g. LGW2). The MME may assign, for both cases, another PGW which has connections both to LIA and RIA local networks (e.g. LGW3). In this case, as previously described, the LGW3 will further select appropriate local network for the UE's access to the local network.

Otherwise, when the MME derives the PGW address from provided APN (e,g, LIA-APN), the MME may add UE's location information to the APN and inquire to the name server (e.g. DNS: Domain Name System). For example, the location information such as (E)CGI, CSG ID, TAI, RAI or LAI may be added to the end, top or middle of the existing APN strings to construct a FQDN for a PGW for UE's local access (LIA) or remote access (RIA). The name server will provide a corresponding PGW address which has connection or capability to connect to appropriate LGW, i.e. connecting to the local network for LIA or RIA. The name server already has a database which contains entries for PGWs connecting or capable to connect LGWs for LIA or RIA connection and FQDN containing the LIA-APN and location information which may be described in optimized manner, e.g. aggregated area to combine multiple areas.

Also, the PGW may derive the target LGW from combination of the APN (LIA-APN) and UE's location information, e.g. FQDN containing the APN and UE's location information or location ID such as (E)CGI, TAI, etc. Also, the information of the target LGW may be provided as static or dynamic data, e.g. subscription data in HSS or AAA server, where ID of the target LGW may be defined per location ID. Once the target LGW is selected, the UE's bearers (e.g. EPS bearers, PDP contexts, etc.) or PDN connections will be bound to the target LGW at the PGW.

Furthermore, the MME may inquire of the base station (i.e. HeNB, eNB), via which the UE request for the connection establishment or which requires handover for the UE, about PGW's address or identifier (e.g. FQDN) which PGW has connection to appropriate LGW. If the base station has knowledge of LGWs for LIA connection and/or PGWs which has connections or capability to connect with the LGWs for LIA connection, the base station provides the PGW address(es) or identifier(s) to the MME. Also, if the base station has knowledge of LGWs for RIA connection and/or PGWs which has connections or capability to connect with the LGWs for RIA connection, the base station provides the PGW address(es) or identifier(s) to the MME. Otherwise, the base station may response nothing. When PGW identifier (e.g. FQDN) is provided from the base station, the MME inquire the identifier to the name server (e.g. DNS server) to derive the PGW address. If no information is provided from the base station, the MME will derive the PGW address utilizing the LIA-APN through the name server.

The base station may provide to the MME the type of the target local network, i.e. LIA indication for UE's LIA connection to be established or RIA indication for UE's RIA connection to be established. The MME includes either indication to Create Bearer Request to be sent to the PGW via the SGW, and the PGW forwards the indication to the LGW, which verifies the indication then establishes the path to appropriate local network, i.e. local network for LIA when LIA indication received, local network for RIA when RIA indication received. The MME may omit to send either indication for overhead reduction in the signaling, i.e. only either RIA or LIA indication can be transmitted for notification.

The indication may be created and contained in the message by the MME or PGW, when the MME or PGW detects whether the LIA connection can be established as described in previous embodiment (embodiment 1 to 16). Also, the HeNB can send the indication to the MME when the HeNB detects during the procedures for attach, service request or handover whether the LIA connection can be established.

Furthermore, information or a result may be provided to the UE, e.g. about which type of connection (i.e. LIA or RIA) has been established or about to which type of local network the connection has been established, from either the MME, LGW or HeNB during either Attach, Service Request or Handover procedure. APN may be used as the information in a message to the UE during the procedure. For example, information or identifier indication the type of connection (LIA or RIA) or type of the local network (for LIA or RIA) may be added into the APN strings as a part of the FQDN. Otherwise, a dedicated flag showing the type of the connection may be used in a message to the UE during the procedure. Such that the UE can adjust (change or modify) QoS configuration for the LIA connection (i.e. EPS and Radio bearer(s)) according to the type of the connection or the local network, e.g. towards better quality for LIA connection, or inform application(s) on the UE for the application(s) to adjust its configuration according to the type of the connection or the network, e.g. to change address of application server.

If the LGW detects no traffic from/to the UE for a defined time period after last traffic from/to the UE, the LGW may switch the connection from LIA to RIA, i.e. release the path for the LIA local network and setup another path for the RIA local network. Such that it can be avoided a case of abuse of the UE inside the company area where a malicious person accesses to the LIA local network and obtains confidential data or information using the UE. In this case, defined authentication procedure, e.g. using user ID and password, may be required to switch back the connection (path) to the LIA access.

If the base station having optimized path for UE's LIA access (i.e. HeNB) detects that the radio bearer(s) for the UE's LIA connection has been released (but the EPS bearer(s) still remained), the base station may indicate the LGW to switch from the LIA connection to the RIA connection, then the LGW does switch the connection from LIA to RIA. Also the MME may indicate the LGW to switch the connection from LIA to RIA when the MME detects that the UE transits to idle mode state (otherwise the LGW receives an implicit indication about the UE's transition to idle mode and recognizes by itself), then the LGW switches the connection from LIA to RIA.

In this embodiment, the LTE architecture including HeNB is used as an example for the explanation of the invention. However, the invention can be applied to other architectures such as UMTS and GPRS as well. For such eases (UMTS and GPRS architectures), HNB, SGSN and PDP context will be used instead of HeNB, MME and EPS bearer respectively.

Each functional block used in the description of the embodiments (embodiment 1 to 17) as given above can be realized as LSI, typically represented by the integrated circuit. These may be produced as one chip individually or may be designed as one chip to include a part or all. Here, it is referred as LSI, while it may be called. IC, system LSI, super LSI, or ultra LSI, depending on the degree of integration. Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used. Further, with the progress of semiconductor technique or other techniques derived from it, when the technique of circuit integration to replace LSI may emerge, the functional blocks may be integrated by using such technique. For example, the adaptation of bio-technology is one of such possibilities.

INDUSTRIAL APPLICABILITY

The invention has the advantage of managing the route to be used for the user's local device access traffic through the use of intelligent switching performed by the home NodeB or home eNodeB. Therefore, the invention can be advantageously used as the management of access to local devices in a mobile communication system.

The invention claimed is:

1. Apparatus for use in a home base station that functions as a proxy for a user equipment (UE) accessing to a local IP network, the apparatus comprising:
   a token generating unit that generates a token to identify a communication channel between a packet data network gateway (PGW) and the home base station when establishing the communication channel, and sends the token to the PGW;
   a receiving unit that receives a token sent from the PGW via a mobility management entity (MME);
   a verifying unit that verifies whether the token received from the PGW is identical to the token created by the token generating unit;
   a proxy function that establishes a path between the home base station and the local IP network, and transfers packets received from the UE to the local IP network using the path; and
   an activating unit that activates the proxy function when the token received from the PGW is identical to the token created by the token generating unit.

2. The apparatus for use in the home base station according to claim 1, the proxy function comprises the components of: an intercept filter; an UE ID mapping; and a tunnel manager.

3. The apparatus for use in the home base station according to claim 1, further comprising:
   an obtaining unit that sends a request for an IP address to the local IP network, and obtains the IP address in the local IP network; and
   a sending unit that sends the obtained IP address to the UE.

4. The apparatus for use in the home base station according to claim 3, wherein the sending unit sends the obtained IP address to the UE via the PGW and the MME using the communication channel when the UE is wirelessly connected to a base station different from the home base station.

5. A path optimization method for a home base station that functions as a proxy for a user equipment (UE) accessing to a local IP network, the method comprising:
   a token generating step that generates a token to identify a communication channel between a packet data network gateway (PGW) and the home base station when establishing the communication channel, and sends the token to the PGW;
   a receiving step that receives a token sent from the PGW via a mobility management entity (MME);
   a verifying step that verifies whether the token received from the PGW is identical to the token created by the token generating step;
   an activating step that activates a proxy function when the token received from the PGW is identical to the token created by the token generating step; and
   a transferring step executed by the activated proxy function that establishes a path, between the home base station and the local IP network, and transfers packets received from the UE to the local IP network using the path.

6. The path optimization method for the home base station according to claim 5, the method further comprising:
   an indicating step that indicates whether the path is established or not, to the UE.

7. The path optimization method for the home base station according to claim 5, the method further comprising:
   a deactivating step that deactivates the proxy function when the UE wirelessly connected to the home base station handovers to a base station different from the home base station.

* * * * *